US012163644B2

(12) United States Patent
Ungaro et al.

(10) Patent No.: US 12,163,644 B2
(45) Date of Patent: Dec. 10, 2024

(54) ADJUSTABLE SINGLE-HOUSING RECESSED LIGHTING SYSTEM

(71) Applicant: Visual Comfort & Co., Skokie, IL (US)

(72) Inventors: James Gerard Ungaro, Riverside, IL (US); Paul Glenn Snagel, Chicago, IL (US); Sean Michael Lavin, Winnetka, IL (US)

(73) Assignee: VISUAL COMFORT & CO., Skokie, IL (US)

( * ) Notice: Subject to any disclaimer, the term of this patent is extended or adjusted under 35 U.S.C. 154(b) by 0 days.

(21) Appl. No.: 17/973,970

(22) Filed: Oct. 26, 2022

(65) Prior Publication Data

US 2023/0125086 A1 Apr. 27, 2023

Related U.S. Application Data

(60) Provisional application No. 63/263,146, filed on Oct. 27, 2021.

(51) Int. Cl.

| | |
|---|---|
| ***F21V 21/04*** | (2006.01) |
| ***F21S 8/02*** | (2006.01) |
| ***F21V 15/01*** | (2006.01) |
| ***F21V 23/00*** | (2015.01) |
| ***F21V 29/70*** | (2015.01) |
| ***F21Y 115/10*** | (2016.01) |

(52) U.S. Cl.

CPC .............. *F21V 21/04* (2013.01); *F21S 8/026* (2013.01); *F21V 15/01* (2013.01); *F21V 23/003* (2013.01); *F21V 29/70* (2015.01); *F21Y 2115/10* (2016.08)

(58) Field of Classification Search

CPC ........ F21V 21/04; F21V 15/01; F21V 23/003; F21V 29/70; F21V 21/041; F21V 21/14; F21S 8/026; F21Y 2115/10; F21Y 2105/18

See application file for complete search history.

(56) References Cited

U.S. PATENT DOCUMENTS

| | | | | |
|---|---|---|---|---|
| 8,567,987 | B2 * | 10/2013 | Wronski | F21V 29/503 362/249.02 |
| 9,222,661 | B2 * | 12/2015 | Kim | F21K 9/00 |
| 9,605,910 | B2 * | 3/2017 | Swedberg | F28F 7/00 |
| 10,408,436 | B2 * | 9/2019 | Wronski | F21V 21/042 |
| 10,563,850 | B2 * | 2/2020 | Danesh | F21V 21/14 |
| 11,391,442 | B2 * | 7/2022 | Danesh | F21V 21/048 |

(Continued)

*Primary Examiner* — Tsion Tumebo

(74) *Attorney, Agent, or Firm* — DUANE MORRIS LLP

(57) ABSTRACT

Recessed lighting systems are provided including a housing defining an interior cavity, a light emitting module positioned inside the interior cavity and including a heat sink, a circuit board stacked on the heat sink, a light source mounted at a center of the circuit board, driver circuitry for powering the light source, and a cover stacked on the circuit board including a channel for enclosing the driver circuitry and an opening defined such that the light source is not covered by the cover, and a trim assembly installed in the housing including a reflector, a trim having a light guide portion and a decorative trim extending from the light guide portion, and a plurality of interface elements extending from an exterior surface of the reflector or an exterior surface of the light guide portion, the interface elements configured to retain the trim assembly in the housing.

10 Claims, 25 Drawing Sheets

(56) References Cited

U.S. PATENT DOCUMENTS

| | | | | |
|---|---|---|---|---|
| 2013/0265779 | A1* | 10/2013 | Scordino | F21K 9/20<br>362/368 |
| 2013/0335980 | A1* | 12/2013 | Nakasuji | F21V 3/02<br>362/375 |
| 2017/0138576 | A1* | 5/2017 | Peng | F21V 23/001 |
| 2018/0216801 | A1* | 8/2018 | Thiele | F21V 19/004 |
| 2019/0195479 | A1* | 6/2019 | Bonne | F21K 9/20 |
| 2020/0182420 | A1* | 6/2020 | Cohen | H02G 3/125 |
| 2021/0254812 | A1* | 8/2021 | Danesh | F21V 15/01 |
| 2022/0243883 | A1* | 8/2022 | Cohen | F21V 21/047 |

* cited by examiner

900

ADJUSTABLE SINGLE-HOUSING RECESSED LIGHTING SYSTEM

PRIORITY

The present application claims the priority of U.S. Provisional Application No. 63/263,146 filed Oct. 27, 2021, the disclosure of which is incorporated herein by reference.

FIELD OF THE INVENTION

This invention relates to lighting systems and more particularly to adjustable, single-housing recessed lighting systems.

BACKGROUND OF THE INVENTION

In order to meet fire and other regulatory codes, recessed lighting systems conventionally include a "can" containing a light source module for mounting into an opening in a ceiling or wall and a separate, insulated driver housing to contain a driver of the lighting system. A trim is generally assembled to the can through the opening in the ceiling or wall. However, because such systems require two separate housings (i.e. the can and the driver housing) they are typically large and lack adjustability. Thus, due to their size and lack of adjustability, installation locations for conventional recessed lighting systems are restricted to larger, more open portions of the ceiling or wall that afford sufficient space and accessibility. In addition, the size and complexity of such systems increases cost of both the hardware of the lighting system and the labor required to install it.

SUMMARY OF INVENTION

Provided herein are adjustable, single-housing recessed lighting systems for installation in a ceiling or wall.

In one aspect a recessed lighting system is provided. The recessed lighting system includes a housing having a closed rear face, an opposing open face, and a sidewall extending between the closed rear face and the opposing open face to define an interior cavity. The recessed lighting system also includes a light emitting module positioned inside the interior cavity of the housing. The light emitting module includes a heat sink. The light emitting module also includes a circuit board stacked on the heat sink. The light emitting module also includes a light source mounted at a center of the circuit board on a side of the circuit board opposite the heat sink. The light emitting module also includes driver circuitry mounted on a portion of the circuit board surrounding the light source, the driver circuitry configured for powering the light source. The light emitting module also includes a cover stacked on the circuit board including a channel sized and positioned to enclose the driver circuitry and defining an opening sized and positioned such that the light source is not covered by the cover. The recessed lighting system also includes a trim assembly installed in the housing through the open face. The trim assembly includes a reflector. The trim assembly also includes a trim having a light guide portion fastened to the reflector and a decorative trim extending radially outward from a base of the light guide portion. The trim assembly also includes a plurality of interface elements extending from an exterior surface of the reflector or an exterior surface of the light guide portion of the trim, the interface elements configured to exert a radial force on an interior surface of sidewall of the housing to retain the trim assembly in the housing.

In another aspect a recessed lighting system is provided. The recessed lighting system includes a housing assembly. The housing assembly includes a housing having a closed rear face, an opposing open face, and a sidewall extending between the closed rear face and the opposing open face to define an interior cavity. The housing assembly also includes first and second brackets engaged with opposing exterior sides of the housing, the first and second brackets each configured to selectively slide along a vertical axis of the housing to permit adjustment of a height of the brackets relative to the housing. The recessed lighting assembly also includes a light emitting module positioned inside the cavity of the housing. The recessed lighting assembly also includes a trim assembly installed in the housing through the open face. The trim assembly includes a reflector. The trim assembly also includes a trim fastened to the reflector. The recessed lighting assembly also includes a length-adjustable hanger bar for suspending the housing between two structural building elements, the length-adjustable hanger bar extending through first and second slots formed, respectively, in an end of each of the first and second brackets proximate the closed rear face of the housing, wherein a position of the housing can be adjusted laterally relative to an opening in a ceiling or wall by sliding the housing, through the slots, along the length-adjustable hanger bar, and wherein a position of the housing can be adjusted vertically relative to the opening in the ceiling or wall by adjusting a height of the brackets relative to the housing.

In another aspect, a lighting enclosure is provided. The lighting enclosure includes a fire-rated housing having a closed rear face, an opposing open face, and a sidewall extending between the closed rear face and the opposing open face to define an interior cavity. The lighting enclosure also includes a light emitting module installed in the fire-rated housing. The lighting enclosure also includes an aperture formed in the sidewall proximate the closed rear face, the aperture sized to permit exterior access to a portion of the interior cavity defined between the light emitting module and the closed rear face. The lighting enclosure also includes a door hingeably attached to the sidewall, the door sized and positioned to cover the aperture in a closed position of the door.

In some embodiments, the fire-rated housing is a junction box. In some embodiments the fire-rated housing is constructed of at least one of aluminum, steel, stainless steel, cast iron, a metallic alloy, plastic, PVC, fiberglass, or combinations thereof. In some embodiments, the lighting enclosure also includes a latch configured to selectively retain the door in a closed position of the door. In some embodiments, the latch is a rotatable element attached to the sidewall and positioned to rotate between a retention position wherein the latch covers a portion of the door in the closed position of the door and a release position wherein the latch does not cover the door in the closed position of the door.

In some embodiments, the light emitting module includes a heat sink. In some embodiments, the light emitting module also includes a circuit board stacked on the heat sink. In some embodiments, the light emitting module also includes a light source mounted at a center of the circuit board on a side of the circuit board opposite the heat sink. In some embodiments, the light emitting module also includes driver circuitry mounted on a portion of the circuit board surrounding the light source, the driver circuitry configured for powering the light source. In some embodiments, the light emitting module also includes a cover stacked on the circuit board including a channel sized and positioned to enclose the driver circuitry and defining an opening sized and positioned such that the light source is not covered by the cover.

In some embodiments, the lighting enclosure also includes a trim assembly installed in the fire-rated housing through the open face. In some embodiments, the trim assembly includes a reflector. In some embodiments, the trim assembly also includes a trim fastened to the reflector. In some embodiments, the trim assembly also includes a plurality of interface elements extending from an exterior surface of the reflector or an exterior surface of the light guide portion of the trim, the interface elements configured to exert a radial force on an interior surface of the housing to retain the trim assembly in the housing.

In another aspect, a light emitting module is provided. The light emitting module includes a heat sink. The light emitting module also includes a circuit board stacked on the heat sink. The light emitting module also includes a light source mounted at a center of the circuit board on a side of the circuit board opposite the heat sink. The light emitting module also includes driver circuitry mounted on a portion of the circuit board surrounding the light source, the driver circuitry configured for powering the light source. The light emitting module also includes a cover stacked on the circuit board including a channel sized and positioned to enclose the driver circuitry and defining an opening sized and positioned such that the light source is not covered by the cover.

In some embodiments, the light source includes at least one LED. In some embodiments, the heat sink includes at least one heat dissipating element formed thereon on a side of the heat sink opposite the circuit board. In some embodiments, the light emitting module also includes a housing having a closed rear face and an opposing open face and defining a cavity, wherein the heat sink, the circuit board, the light source, and the cover are positioned within the housing such that the light source faces the opposing open face. In some embodiments, the light emitting module also includes a trim assembly installed in the housing through the open end. In some embodiments the trim assembly includes a reflector. In some embodiments, the trim assembly also includes a trim fastened to the reflector. In some embodiments, the trim assembly also includes a plurality of interface elements extending from an exterior surface of the reflector or an exterior surface of the light guide portion of the trim, the interface elements configured to exert a radial force on an interior surface of the housing to retain the trim assembly in the housing.

In another aspect, a recessed lighting system is provided. The recessed lighting system includes a housing assembly. The housing assembly includes a fire-rated housing having a closed rear face, an opposing open face, and a sidewall extending between the closed rear face and the opposing open face to define an interior cavity. The housing assembly also includes an aperture formed in the sidewall proximate the closed rear face, the aperture sized to permit exterior access to a portion of the interior cavity defined between the light emitting module and the closed rear face. The housing assembly also includes a door hingeably attached to the sidewall, the door sized and positioned to cover the aperture in a closed position of the door. The housing assembly also includes first and second brackets engaged with opposing exterior sides of the housing, the first and second brackets each configured to selectively slide along a vertical axis of the housing to permit adjustment of a height of the brackets relative to the housing. The housing assembly also includes a light emitting module positioned inside the interior cavity of the housing. The light emitting module includes a heat sink. The light emitting module also includes a circuit board stacked on the heat sink. The light emitting module also includes a light source mounted at a center of the circuit board on a side of the circuit board opposite the heat sink. The light emitting module also includes driver circuitry mounted on a portion of the circuit board surrounding the light source, the driver circuitry configured for powering the light source. The light emitting module also includes a cover stacked on the circuit board including a channel sized and positioned to enclose the driver circuitry and defining an opening sized and positioned such that the light source is not covered by the cover. The recessed lighting system also includes a trim assembly installed in the housing through the open end. The trim assembly includes a reflector including at least one reflective surface positioned to direct light from the light source toward a lens. The trim assembly also includes the lens positioned between the reflector and a trim. The trim assembly also includes the trim. The trim includes a light guide portion extending from the lens through the open end of the housing to a base of the light guide portion. The trim also includes a decorative trim extending radially outward from the base of the light guide portion. The trim also includes a plurality of interface elements extending from an exterior surface of the reflector or an exterior surface of the light guide portion of the trim, the interface elements configured to exert a radial force on an interior surface of the housing to retain the trim assembly in the housing. The recessed lighting system also includes a length-adjustable hanger bar for suspending the housing between two structural building elements, the length-adjustable hanger bar extending through first and second slots formed, respectively, in an end of each of the first and second brackets proximate the closed rear face of the housing, wherein a position of the housing can be adjusted laterally relative to an opening in a ceiling or wall by sliding the housing, through the slots, along the length-adjustable hanger bar, and wherein a position of the housing can be adjusted vertically relative to the opening in the ceiling or wall by adjusting a height of the brackets relative to the housing.

BRIEF DESCRIPTION OF THE FIGURES

Embodiments of the present disclosure will now be described, by way of example only, with reference to the attached Figures, wherein:

FIG. 3A is an exterior perspective view of the housing having an access door in an open position in accordance with various embodiments.

DETAILED DESCRIPTION OF THE INVENTION

Figure 1A:
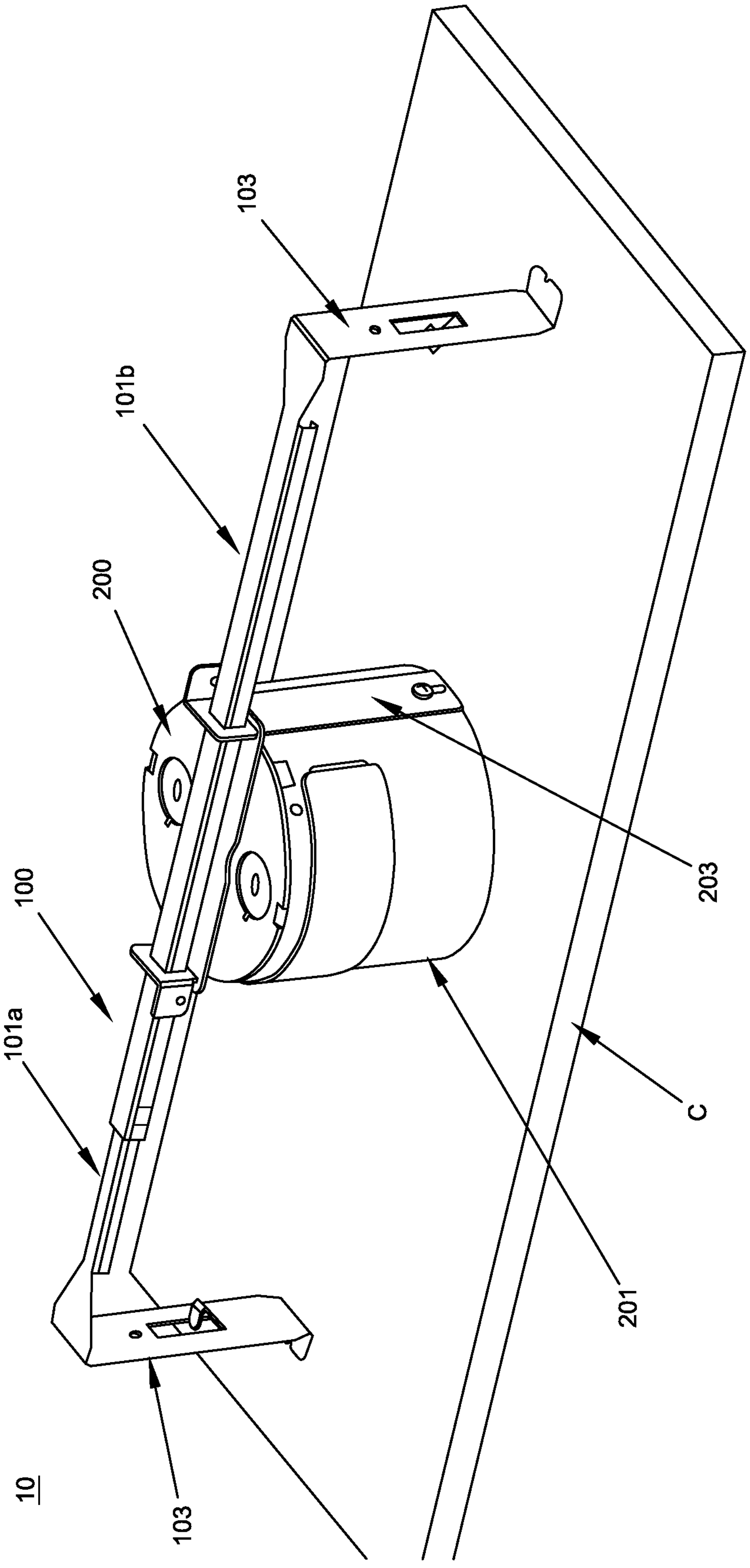
FIG. 1A is a top right perspective view of an adjustable, single-housing recessed lighting system installed in a ceiling in accordance with various embodiments.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments, as the skilled artisan would recognize, even if not explicitly stated herein.

Descriptions of well-known components and processing techniques may be omitted to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

Provided herein are an adjustable, single-housing recessed lighting systems for use in connection with the installation of recessed lighting in both new construction and remodeling applications. Although shown and described herein as being installed in a ceiling, it will be apparent in view of this disclosure that the adjustable, single-housing recessed lighting systems provided herein can also be installed in walls and/or floors in connection with various embodiments.

Referring now to FIGS. 1A-1D, an adjustable, single-housing recessed lighting system 10 can include a housing assembly 200 suspended within an opening of a ceiling C from a length-adjustable hanger bar 100. The housing assembly 200 can generally be configured for housing a light emitting module 300 (see FIGS. 5A-5B) and removable installation of a trim assembly 400 (see FIG. 6A) therein.

Figure 1B:
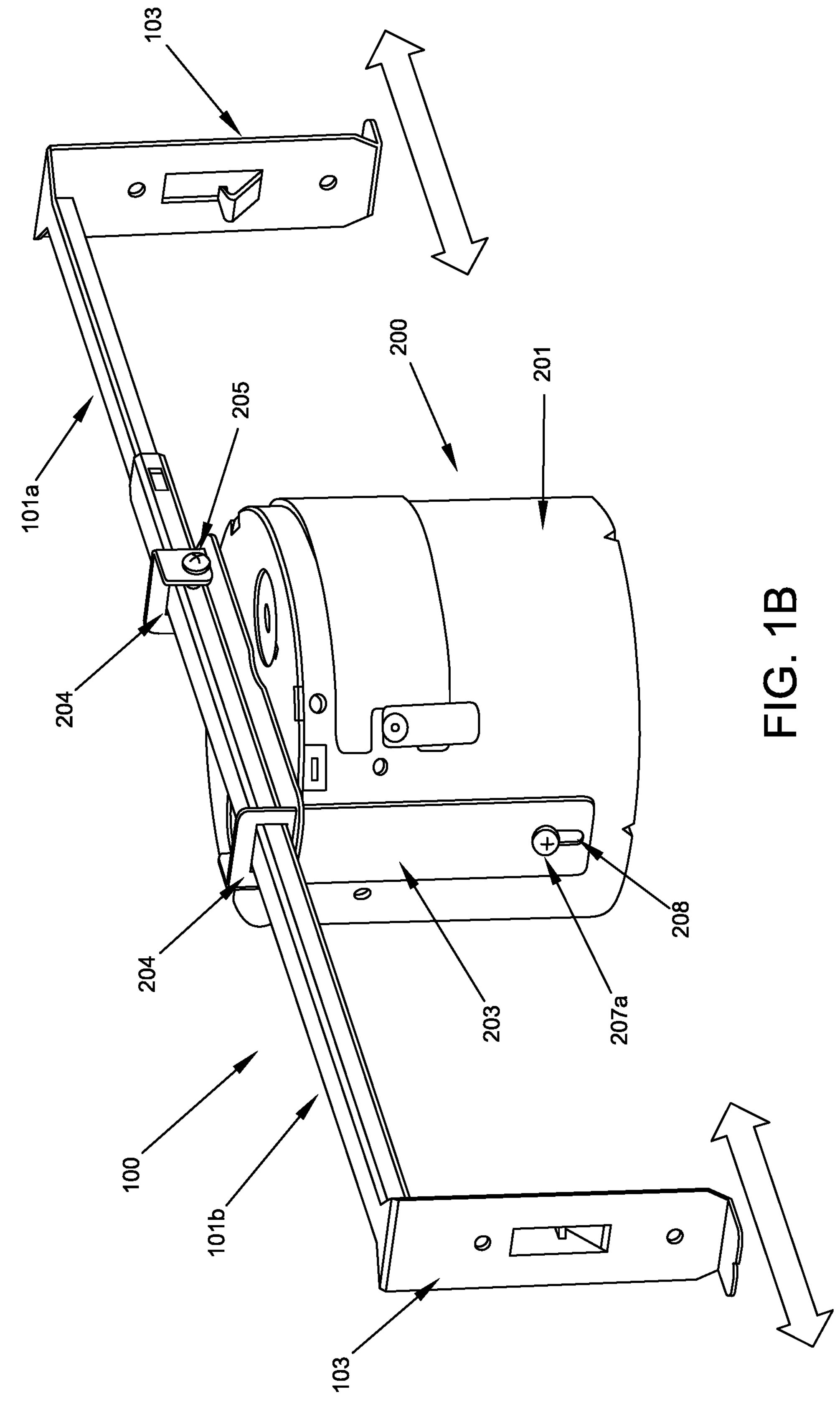
FIG. 1B is a top left perspective view of the adjustable, single-housing recessed lighting system in accordance with various embodiments.
Figure 1C:
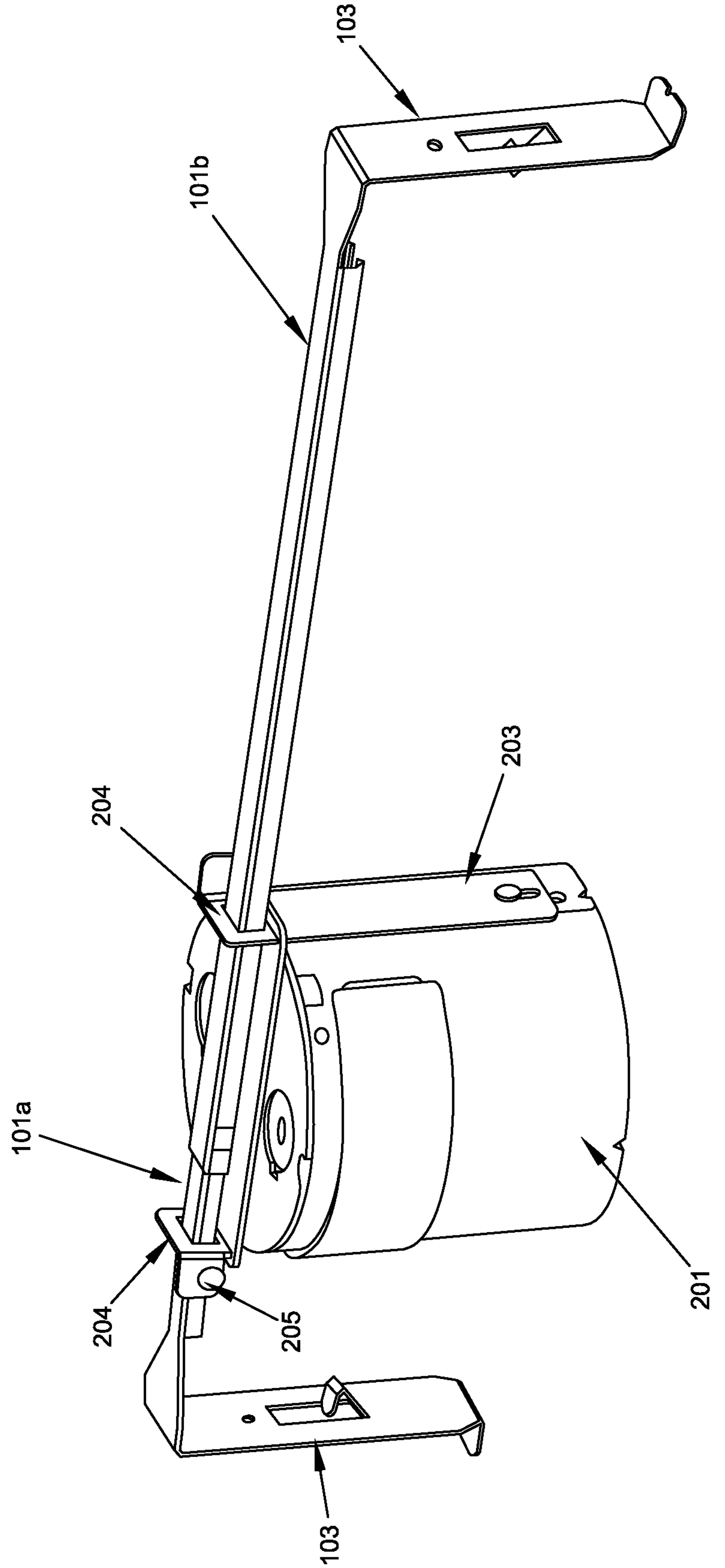
FIG. 1C is a top right perspective view of the adjustable, single-housing recessed lighting system in a first lateral position in accordance with various embodiments.
Figure 1D:
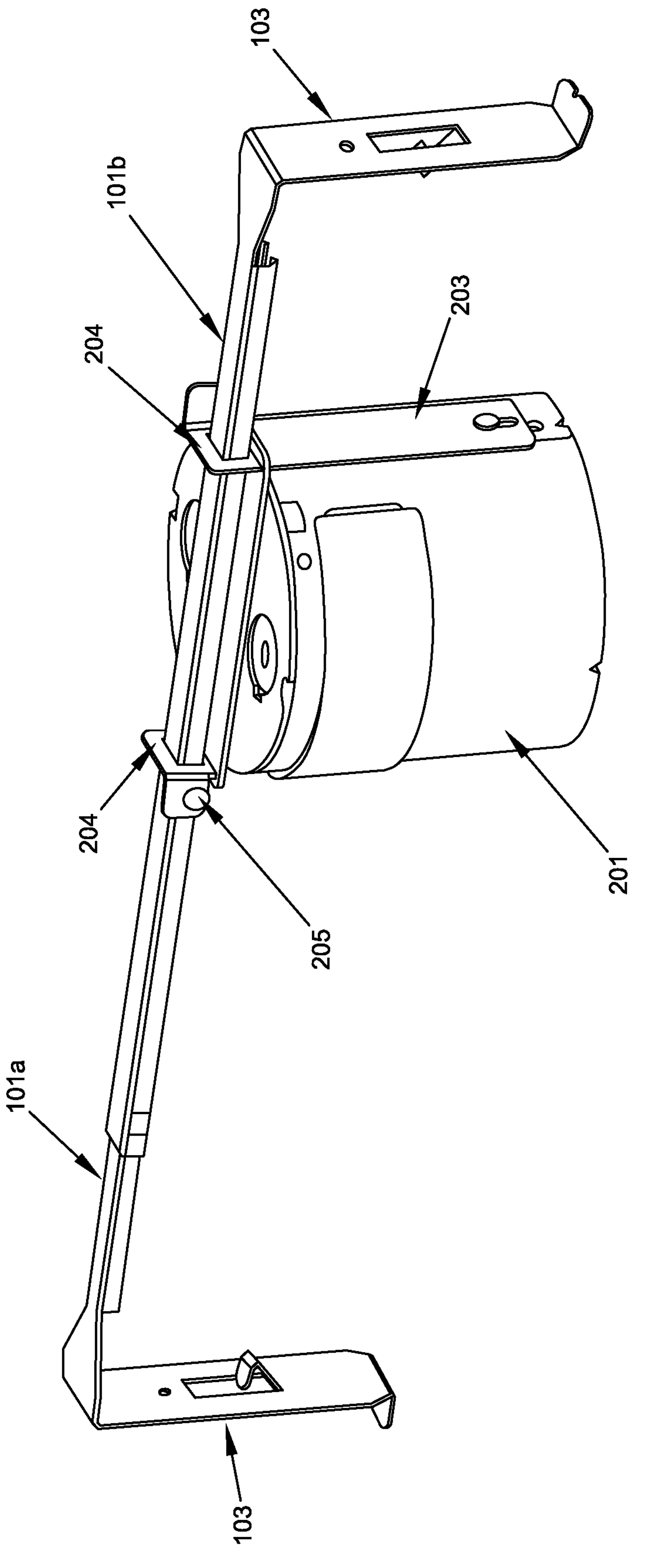
FIG. 1D is a top right perspective view of the adjustable, single-housing recessed lighting system in a second lateral position in accordance with various embodiments.

The hanger bar 100 can include a first and second slideable elements 101*a*, 101*b* configured to slideably expand and contract the hanger bar 100 along a longitudinal axis thereof in order to fit within a space for mounting. In some embodiments, as best shown in FIG. 1B, the first slideable element 101*a* can be configured to slide within the second slideable element 101*b* to expand and contract a length of the hanger bar 100. The hanger bar 100 can also include opposing hanger brackets 103 for attachment to a mounting surface. As shown in FIGS. 1A-1D, each of the hanger brackets 103 can be generally attached to or integrally formed in an end of one of the slideable elements 101*a*, 101*b*. Installation of the hangar bracket 100 can be achieved, for example, by expanding or contracting the hanger bar 100 via the slideable elements 101*a*, 101*b* such that the hanger bar 100 spans a space between two ceiling or wall joists and each of the hanger brackets 103 is positioned to be attached to one of the joists. The hanger brackets 103 can be attached to the joists or other mounting surfaces via any suitable means including, for example, screws, bolts, adhesives, clamps, or combinations thereof. The hangar bar 100 and hanger brackets 103 can be made of any suitable material according to a weight of the system 10 and any applicable electrical or fire rating requirements. Such materials can include metallic materials (e.g., aluminum, steel, including stainless steel, cast iron), non-metallic materials (e.g., plastic, PVC, fiberglass), or combinations thereof. For example, the hanger bars 100 and hanger brackets 103 shown in FIGS. 1A-1D are constructed of metal.

Still referring to FIGS. 1A-1D, a housing 201 of the housing assembly 200 can be suspended from the hanger bar 100 via suspension slots 204 formed in opposing vertical brackets 203. In particular, as shown in FIGS. 1A-1D, the vertical brackets 203 can each include a suspension slot 204 extending outward from a surface of the housing 201 and sized to permit the hanger bar 100 to pass therethrough. In this manner, the housing assembly 200 can be repositioned along the hanger bar 100 between the two hanger brackets 103. Generally speaking, such adjustment is most likely after installation of the hanger bar 100 (e.g., between the two joists) in the wall or above the ceiling C in order to laterally position the housing assembly at a desired location for light to be emitted into the room. The vertical brackets 203 can also each include one or more locking screws 205 for setting a position of the housing assembly 200 relative to the hanger bar 100.

Figure 2A:
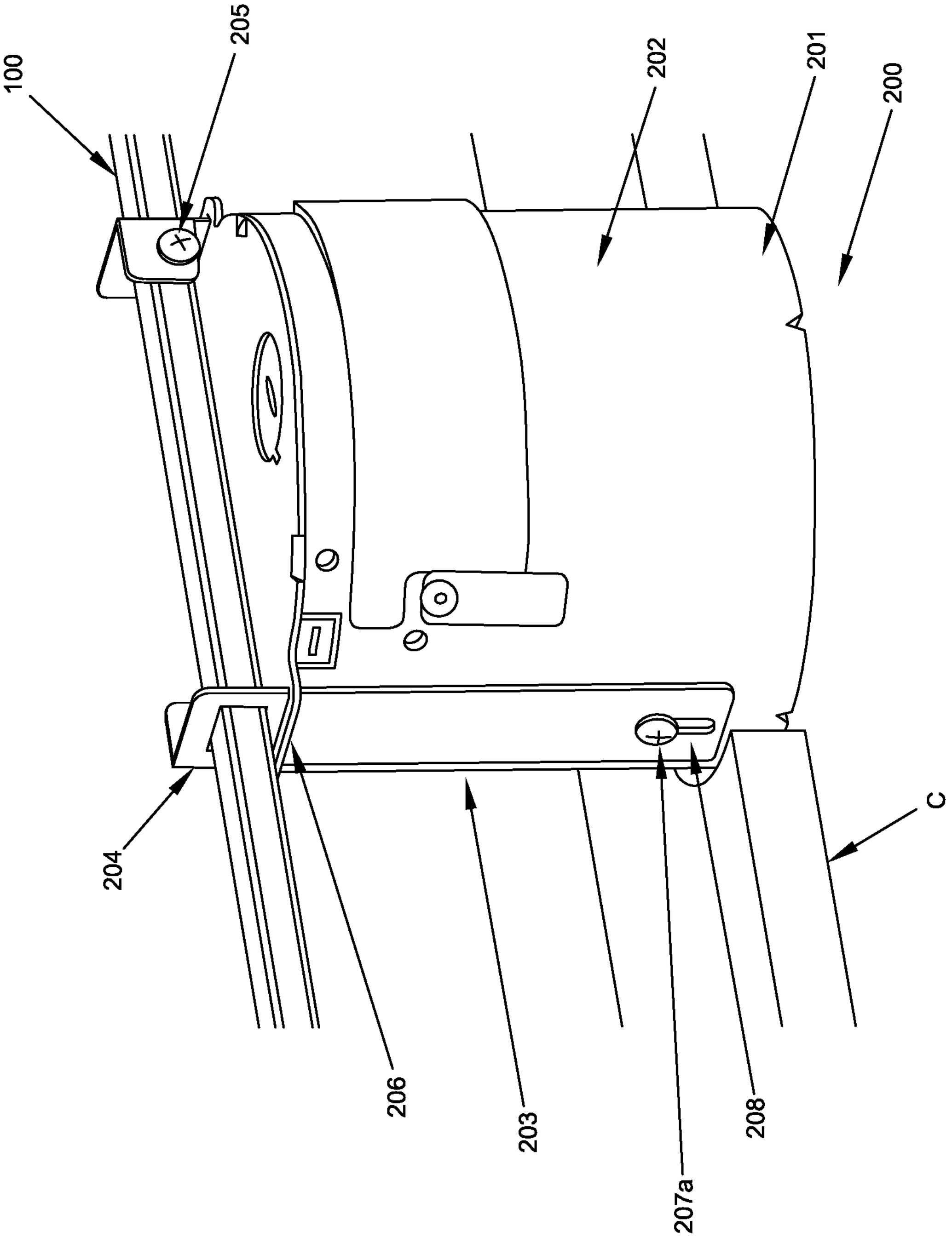
FIG. 2A is an exterior perspective view of a housing of the adjustable, single-housing recessed lighting system in accordance with various embodiments.
Figure 2B:
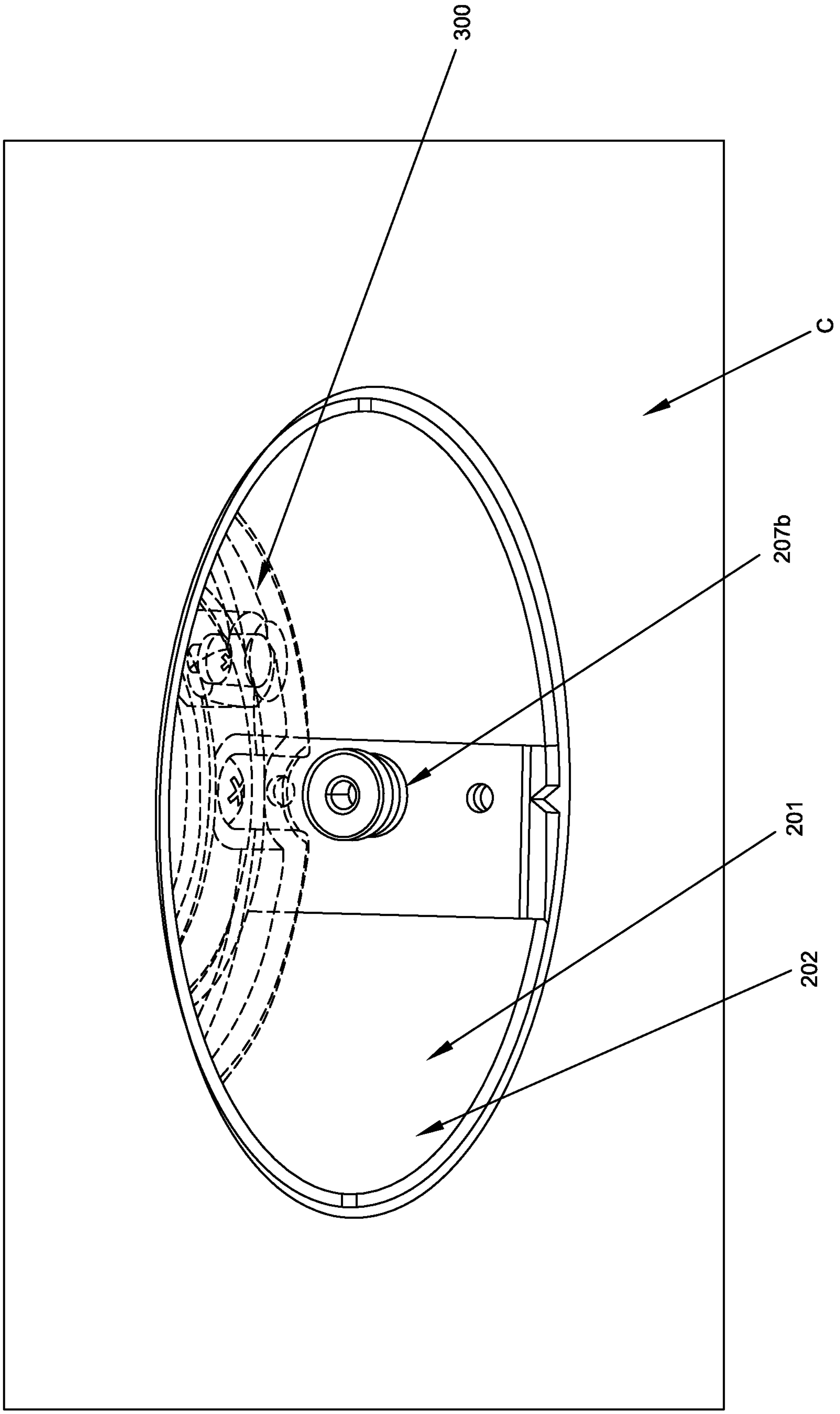
FIG. 2B is a partial interior perspective view of the housing of the adjustable, single-housing recessed lighting system in accordance with various embodiments.
Figure 2C:
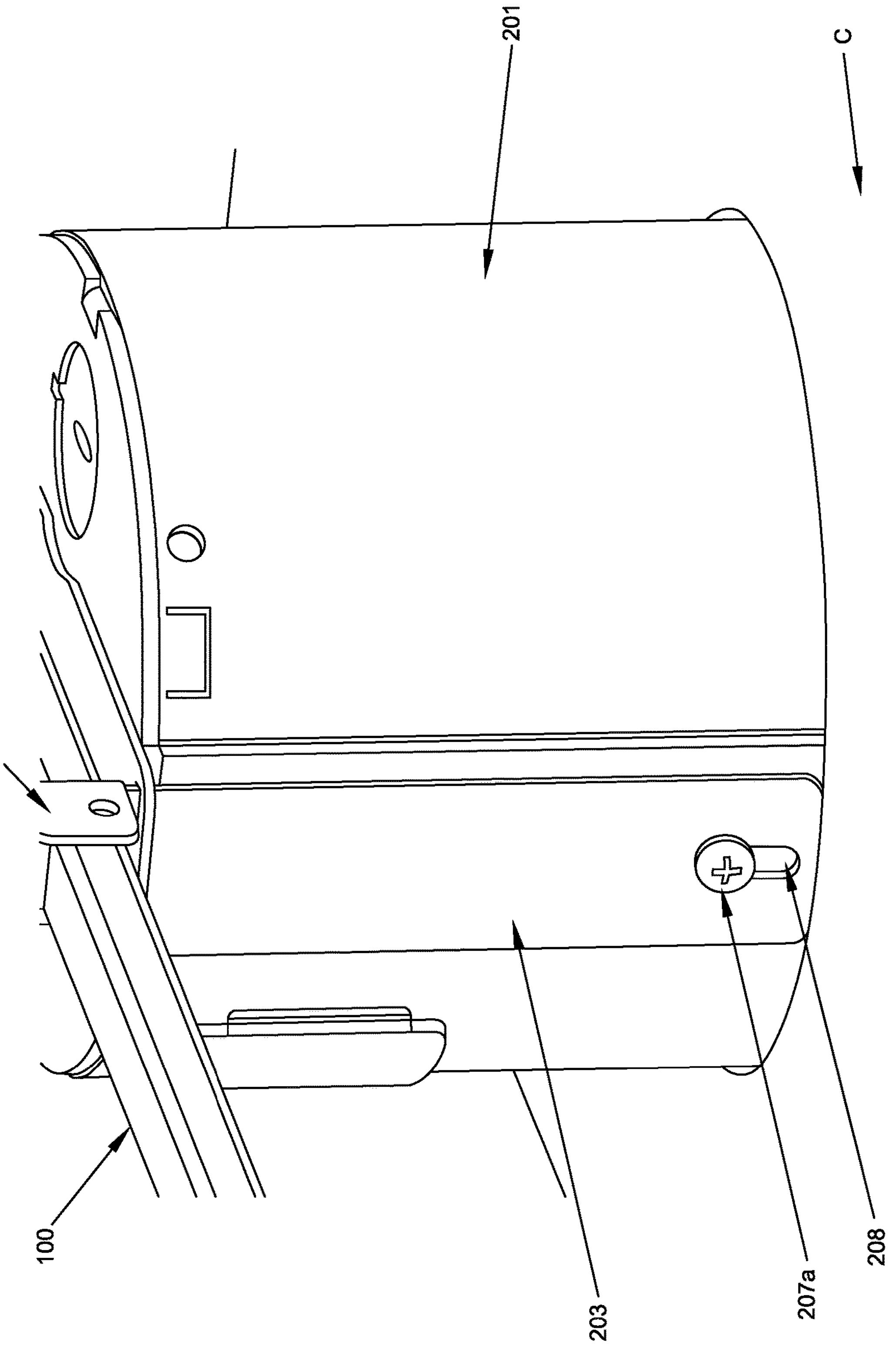
FIG. 2C is an exterior perspective view of the housing in a raised position in accordance with various embodiments.
Figure 2D:
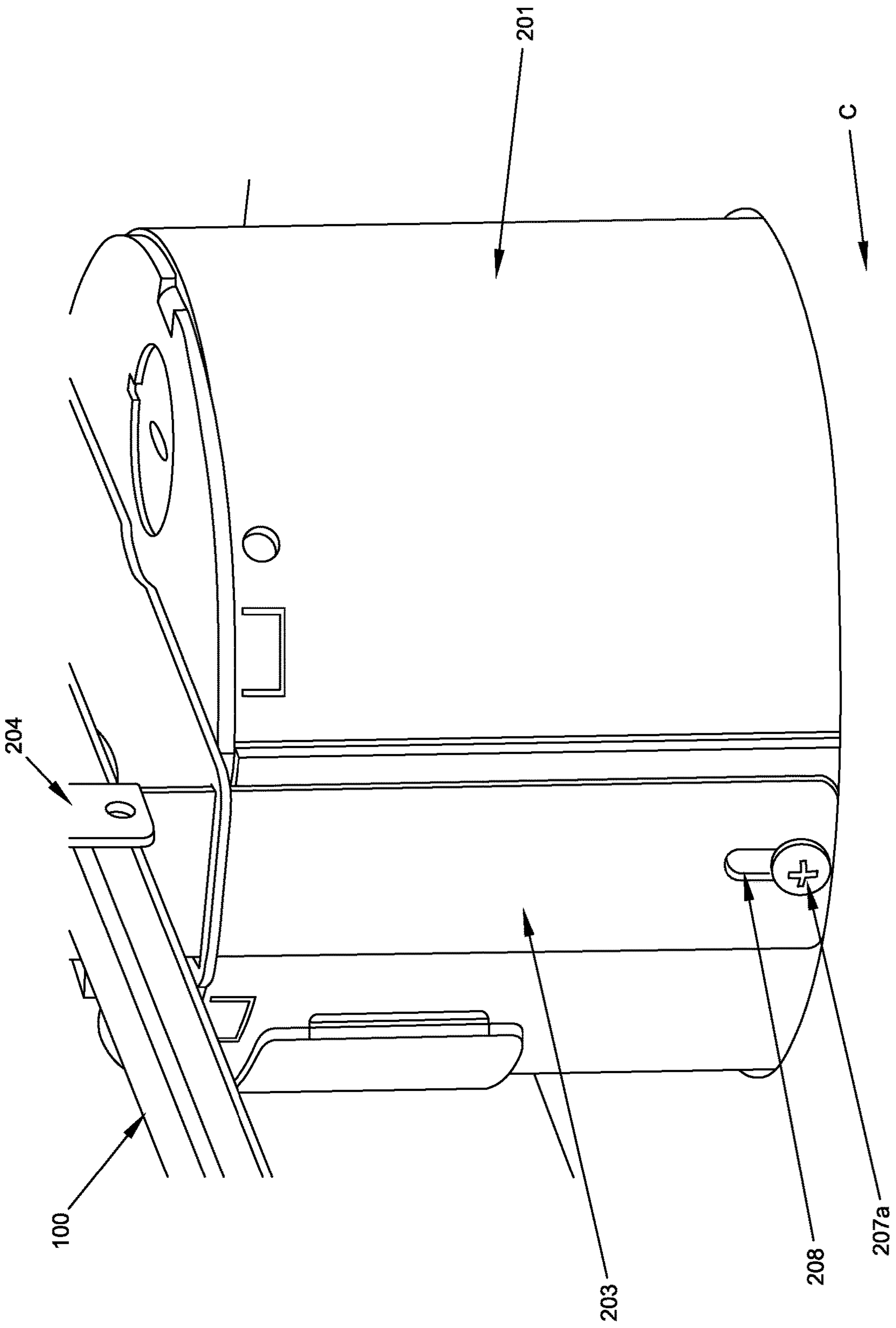
FIG. 2D is an exterior perspective view of the housing in a lowered position in accordance with various embodiments.

Referring now to FIGS. 2A-2D, the housing 201 can preferably include an enclosure defining an interior volume therein and including an opening in at least one side thereof to permit light emission from the housing 201. For example, as shown in FIGS. 2A-2B, the housing 201 can be substantially cylindrical having a closed end or face proximate the hanger bar 100, an open end or face opposite the hanger bar 100, and a sidewall 202 extending therebetween. However, it will be apparent in view of this disclosure that any shaped housing can be used in accordance with various embodiments. That is, in addition to the round cross-section of the illustrated cylindrical housing, in some embodiments the housing can have a cross-section of any suitable shape, including, for example, square, rectangular, hexagonal, octagonal, elliptical, or any other suitable shape.

The housing 201 and vertical brackets 203 can be made of any suitable material according to a weight of the system 10 and any applicable electrical or fire rating requirements. Such materials can include metallic materials (e.g., aluminum, steel, including stainless steel, cast iron), non-metallic materials (e.g., plastic, PVC, fiberglass), or combinations thereof. For example, the housing 201 and vertical brackets 203 shown in FIGS. 1A-1D and 2A-2D are constructed of metal.

The housing 201 can be slideably assembled to the brackets 203 via bracket slots 206 and vertical slots 208 so as to be vertically repositionable (i.e. repositionable along an axis substantially perpendicular to the longitudinal axis of the hanger bar 100) relative to a ceiling C or wall and/or the hanger bar 100. The bracket slot 206 can generally protrude outward from the housing 201 perpendicular to a corresponding suspension slot 204 and be sized to permit the vertical bracket 203 to pass therethrough. The vertical slots 208 can be formed in the vertical brackets 203 as generally elongated holes. In order to provide a second retention point for each vertical bracket 203 on the housing 201 and to facilitate vertical repositioning of the housing 201 relative to the hanger bar 100 and the ceiling C or wall, a positioning screw 207*a* can extend through both the vertical slot 208 and the housing 201. As shown in FIG. 2B, which is an interior view of the housing 201, a corresponding nut 207*b* can be assembled to the positioning screw 207*a* within the housing 201. In some embodiments, for ease of installation, the positioning screw 207*a* can be a thumb screw, the corresponding nut 207*b* can be a thumb nut, or both.

To achieve a desired height of the housing 201 relative to a wall or ceiling C, as shown, for example, in FIGS. 2A-2D, the positioning screws 207*a* and nuts 207*b* can be loosened to permit the vertical brackets 203 to slide through the corresponding bracket slots 206 and to slide the vertical slots 208 relative to the positioning screws 207*a*. Once a desired height of the housing 201 is achieved, the positioning screws 207*a* and nuts 207*b* can be retightened to fix the vertical position of the housing 201. In this manner, as shown, for example, in FIGS. 2C-2D, the housing 201 can be moved between an uppermost vertical position (FIG. 2C) and a lowermost vertical position (FIG. 2D) along a length of the vertical slot 208. Accordingly, the length of the vertical slot 208 generally determines the range of vertical adjustment of the housing 201.

Figure 2E:
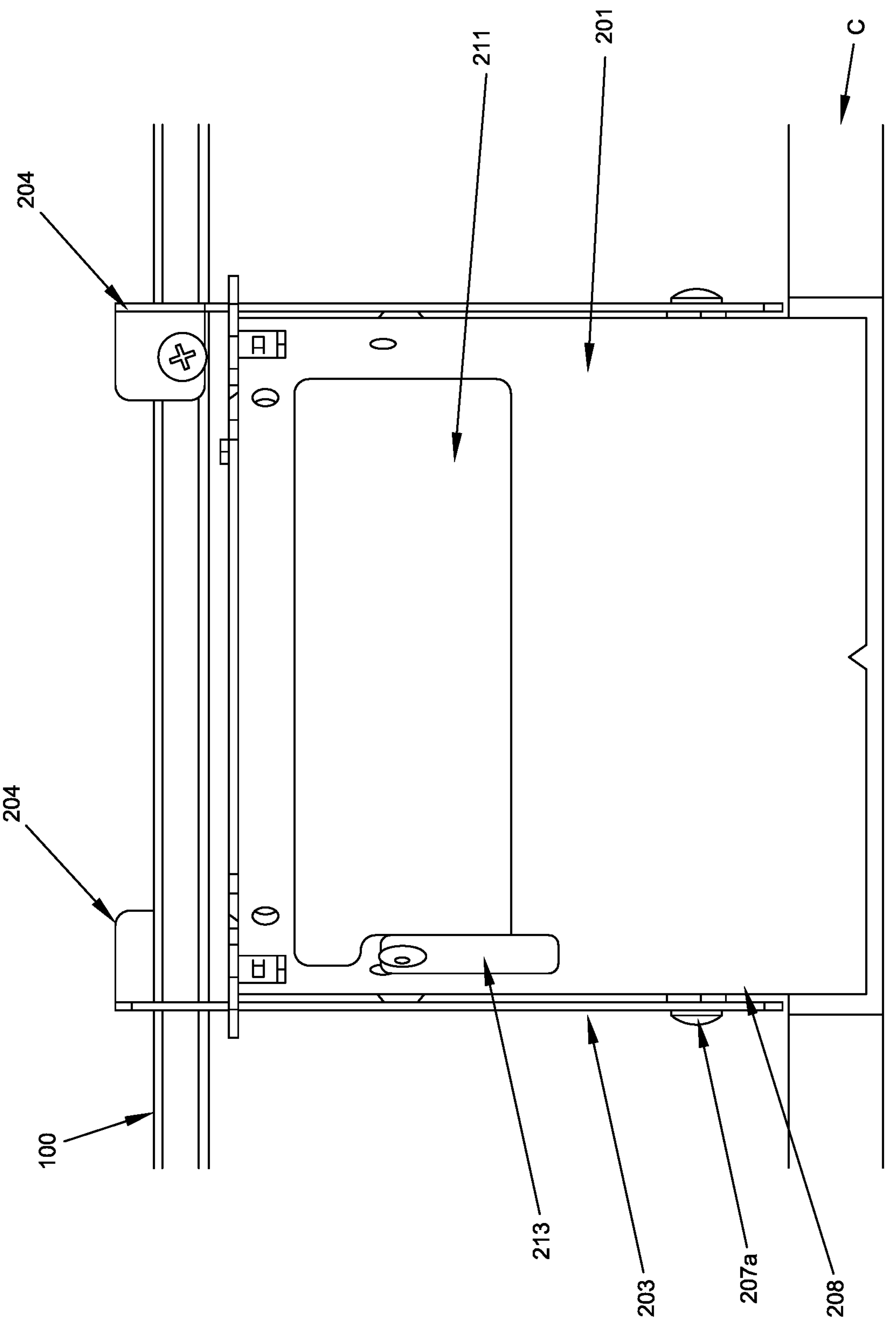
FIG. 2E is a front view of the housing in a raised position in accordance with various embodiments.
Figure 2F:
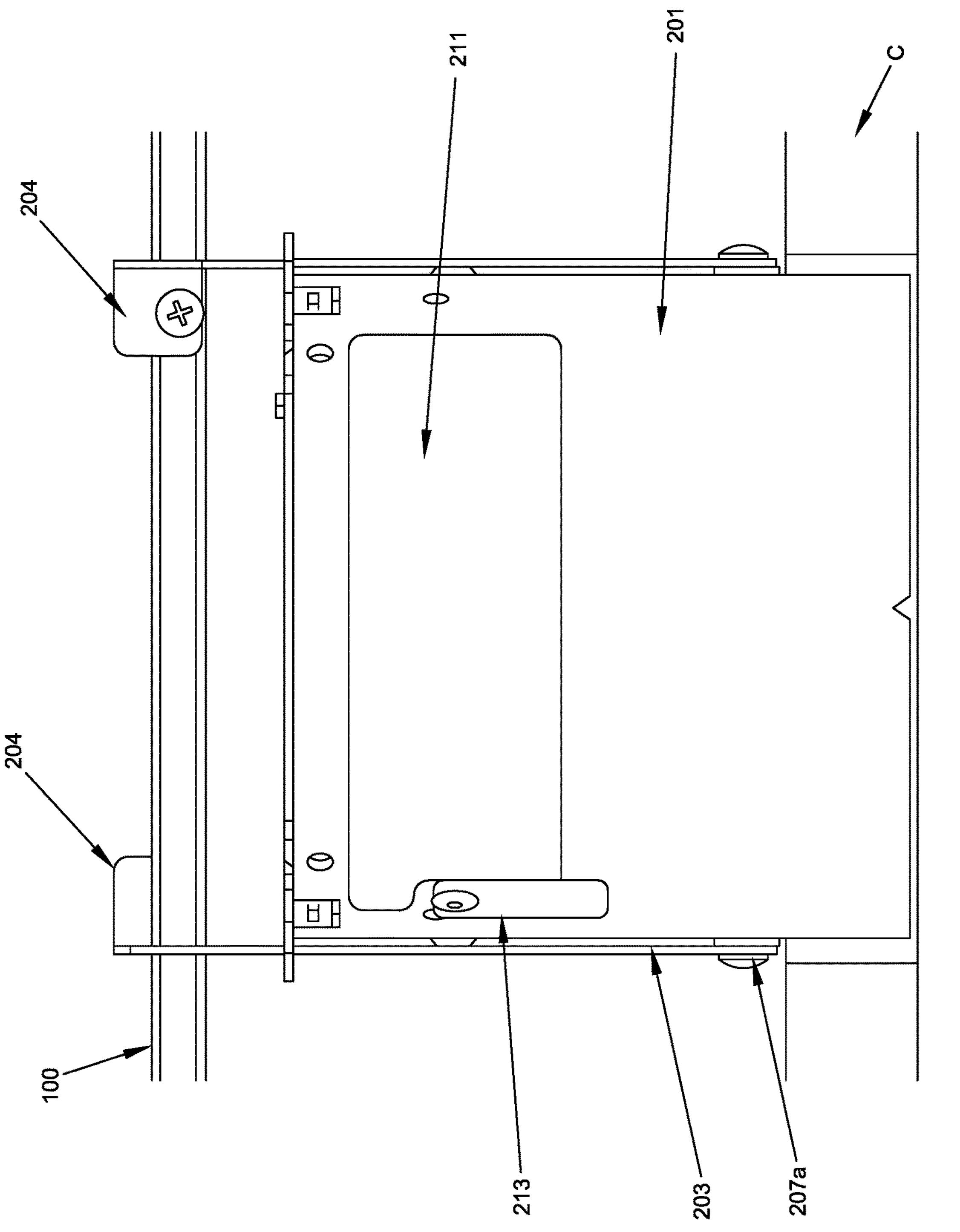
FIG. 2F is a front view of the housing in a lowered position in accordance with various embodiments.

The vertical adjustment discussed above is generally useful for achieving proper alignment between the housing 201 and the ceiling C or wall so that proper mating with the trim 400 (see FIGS. 6A-6B) can be achieved. As shown, for example, in FIGS. 2E and 2F, in some embodiments the housing 201 can preferably be positioned substantially flush with an interior surface of the ceiling C or wall (i.e. a surface of the ceiling C facing away from the hanger bar 100). In such embodiments, the housing 201 may need to be raised where the ceiling C is thin (FIG. 2E) and lowered where the ceiling C is thicker (FIG. 2F).

Figure 3A:
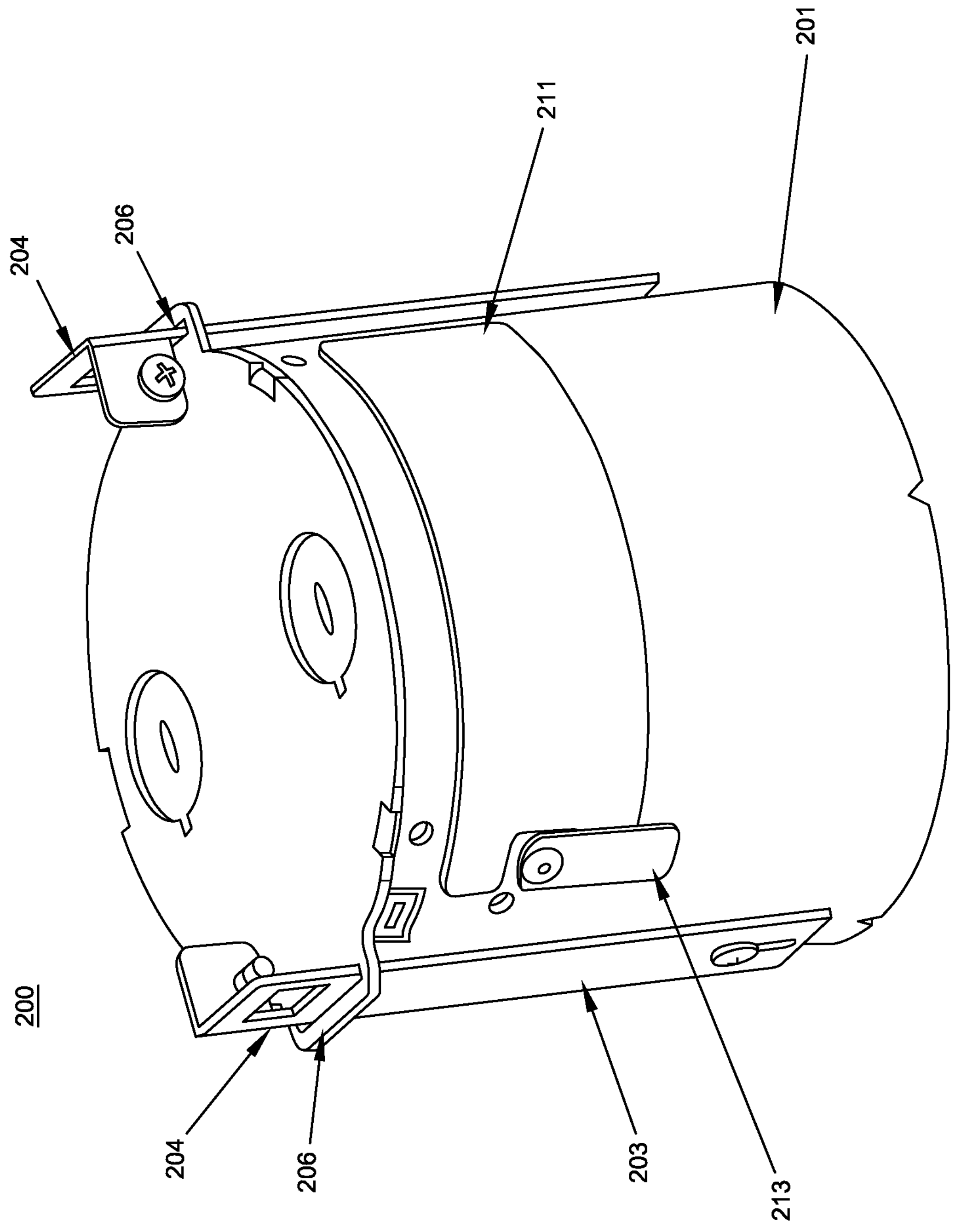
FIG. 3A is an exterior perspective view of the housing having an access door in a closed position in accordance with various embodiments.
Figure 3B:
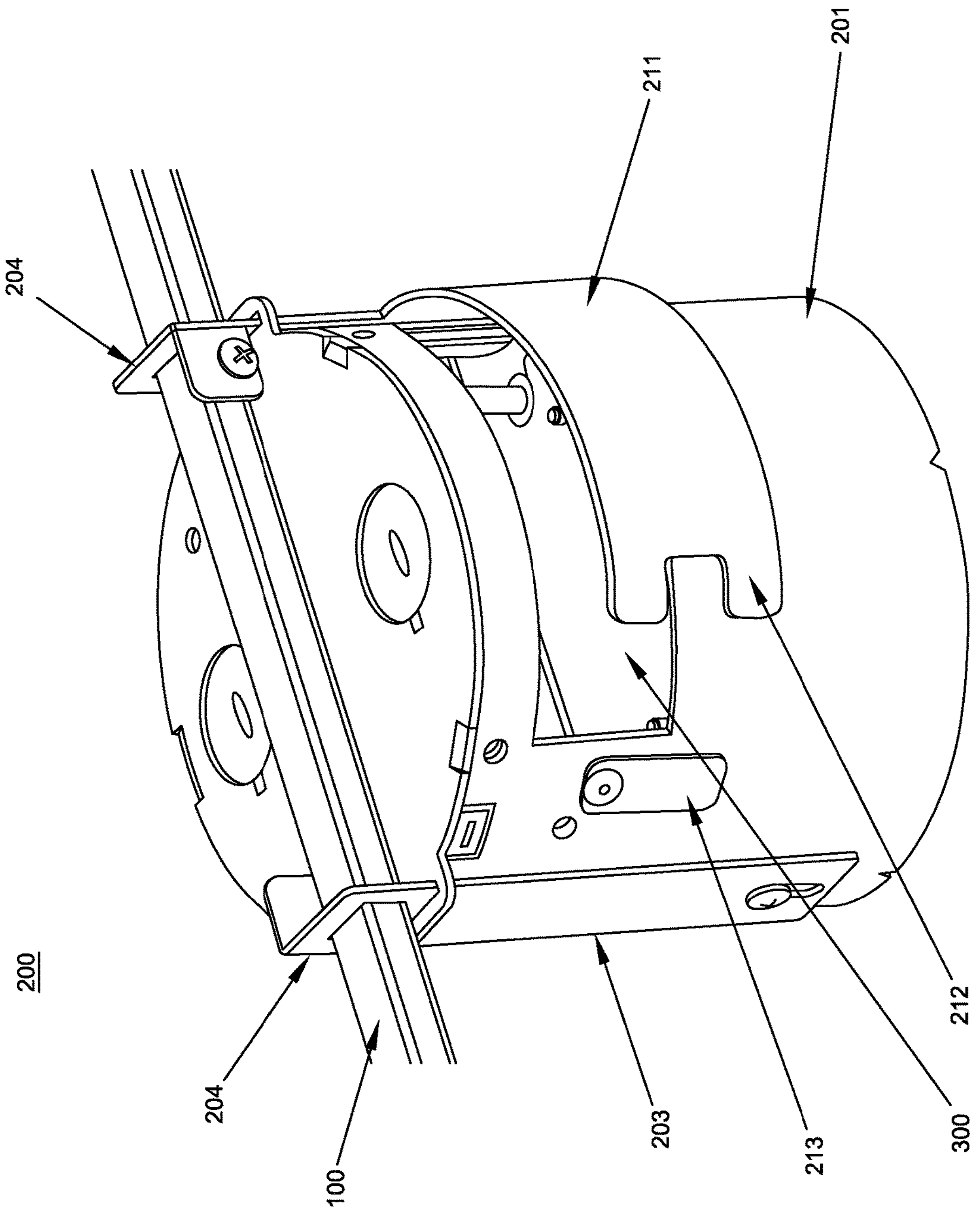
Figure 5A:
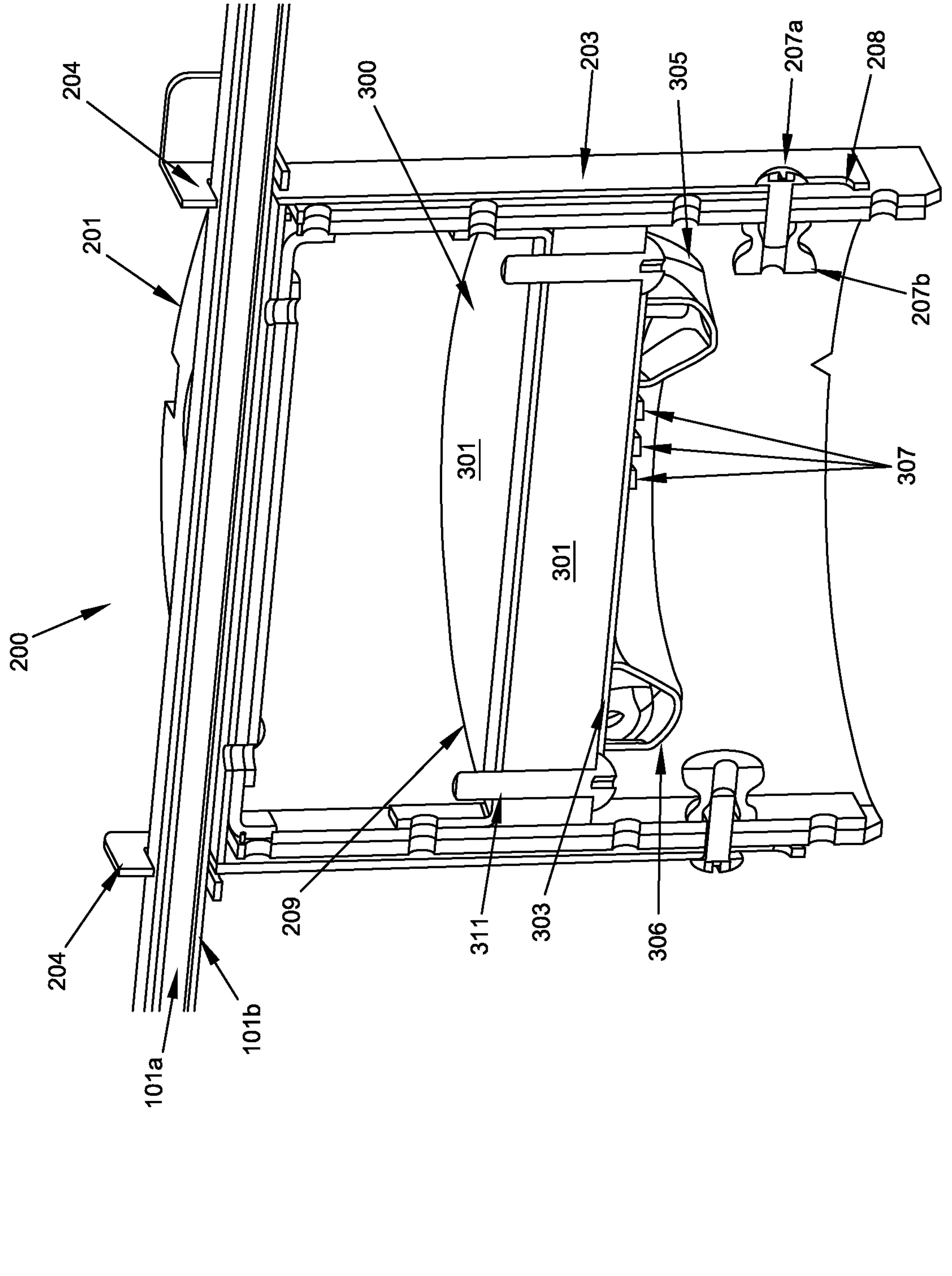
FIG. 5A is a cross-sectional view of the housing having a light emitting module installed therein in accordance with various embodiments.

Referring now to FIGS. 3A-3B, in some embodiments the housing 201 can also include an access door 211 to provide wiring access to an upper portion of an interior volume of the housing 201. The upper portion of the interior volume of the housing 201, as used herein, can include any portion of the interior volume of the housing 201 located above the light emitting module 300 when the light emitting module 300 is installed within the housing assembly 200 (e.g., as depicted in FIGS. 3B and 5A). Still referring to FIGS. 3A-3B, the door 211 can also include a latch 213 for selectively retaining the door 211 in a closed position or releasing the door for opening. The latch 213 can be, for example, a rotatable element configured to cover and restrain a portion of the door 211 such as a protrusion 212. More generally, although shown herein as having a side hinge and a rotatable latch, it will be apparent in view of this disclosure that any access door 211 configuration can be used in accordance with various embodiments. For example, access doors 211 in accordance with various embodiments may include top hinges, bottom hinges, tabbed removable cover plates, or any other suitable configuration. Furthermore, latches 213, as used herein, can generally be any mechanism or device for selectively retaining the door 211 in a closed position. For example, the latch 213 could be, in accordance with some embodiments, a spring v-shaped latch, a tab for insertion into the housing 201, or any other suitable configuration. The access door 211 can be constructed of a same or different material as the housing 201, including, for example, metallic materials (e.g., aluminum, steel, including stainless steel, cast iron), non-metallic materials (e.g., plastic, PVC, fiberglass), or combinations thereof.

In use, the access door 211 can advantageously provide exterior access to the upper portion of the interior of the housing 201 even when the light emitting module 300 is pre-assembled into the housing 201 before being wired into mains. Importantly, the ability to pre-assemble the lighting module prior to wiring permits the lighting system 10 to be shipped from the manufacturer pre-assembled, reducing the number of separate parts to be shipped and assembled, thereby facilitating faster, less complex installation of the recessed lighting system 10 at the jobsite and reducing packaging required to ship the system 10, which, in turn, reduces the installed cost of the lighting system 10.

In some embodiments, the housing 201 and the access door 211 can form a fire-rated junction box. "Fire-rated", as used herein, refers to a junction box or other housing 201 meeting or exceeding the fire resistance requirements of at least one industry, regulatory, statutory, or other standard associated with junction boxes. Such housings may include, for example, housings 201 capable of meeting UL514A, PH120, E30, E60, E90, or any other standard.

Figure 4:
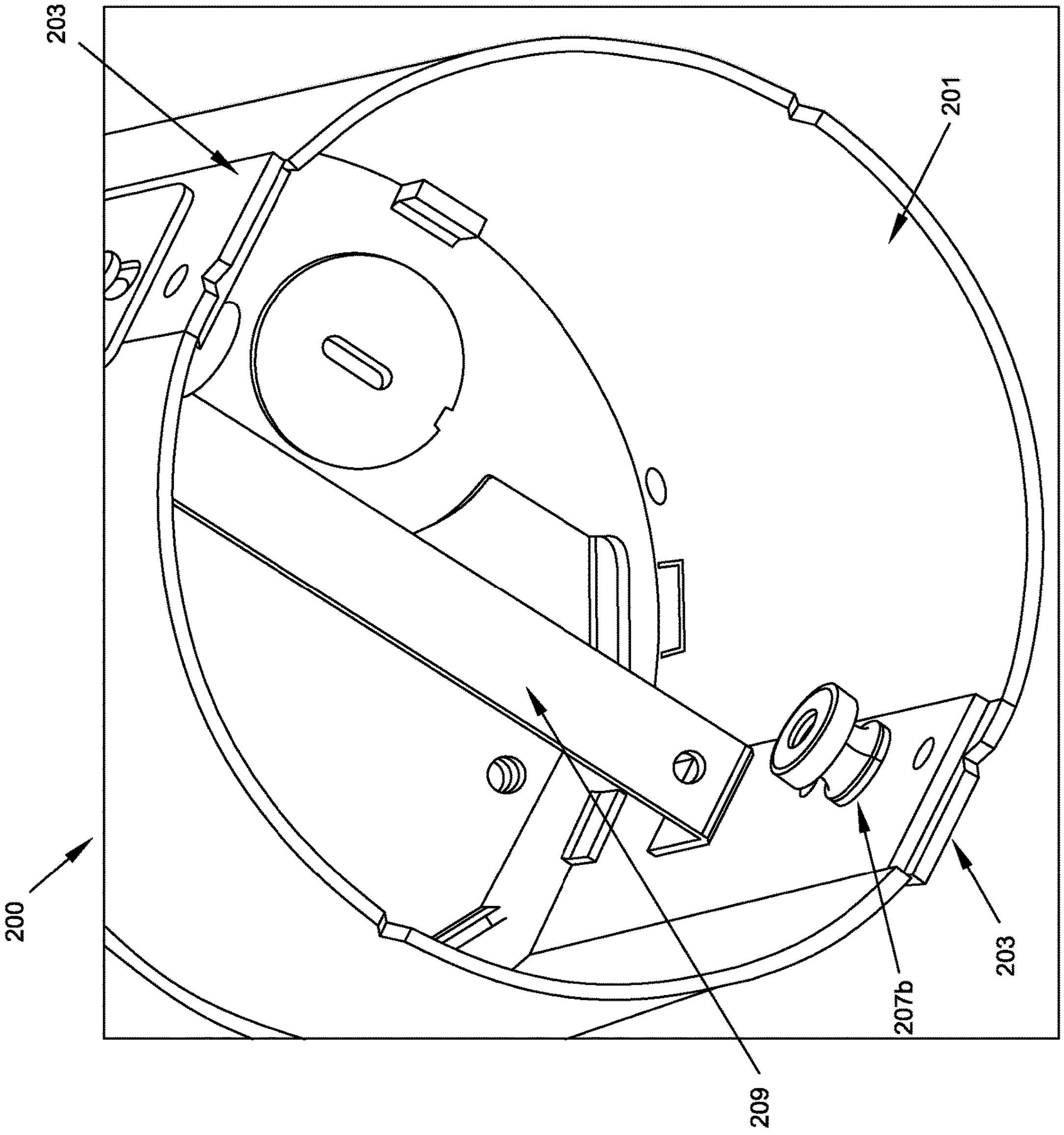
FIG. 4 is an interior perspective view of the housing having a crossbar in accordance with various embodiments.

As shown in FIG. 4, the housing assembly 200 also includes a crossbar 209 extending across the interior volume of the housing 201. The crossbar 209 can generally be configured for mounting of the light emitting module 300 thereto. As best shown in FIG. 5A, the light emitting module 300 includes a heat sink 301, a circuit board 303 stacked on the heat sink 301, and a cover 305 stacked on the circuit board 303 opposite the heat sink 301 to enclose at least one electrical component mounted on the circuit board 303. The light emitting module 300 can be assembled within the housing 201 by using assembly bolts 311 to fasten the stacked components of the light emitting module 300, including the heat sink 301, the circuit board 303, and the cover 305 to the crossbar 209, thereby retaining the light emitting module within in the housing 201.

Figure 5B:
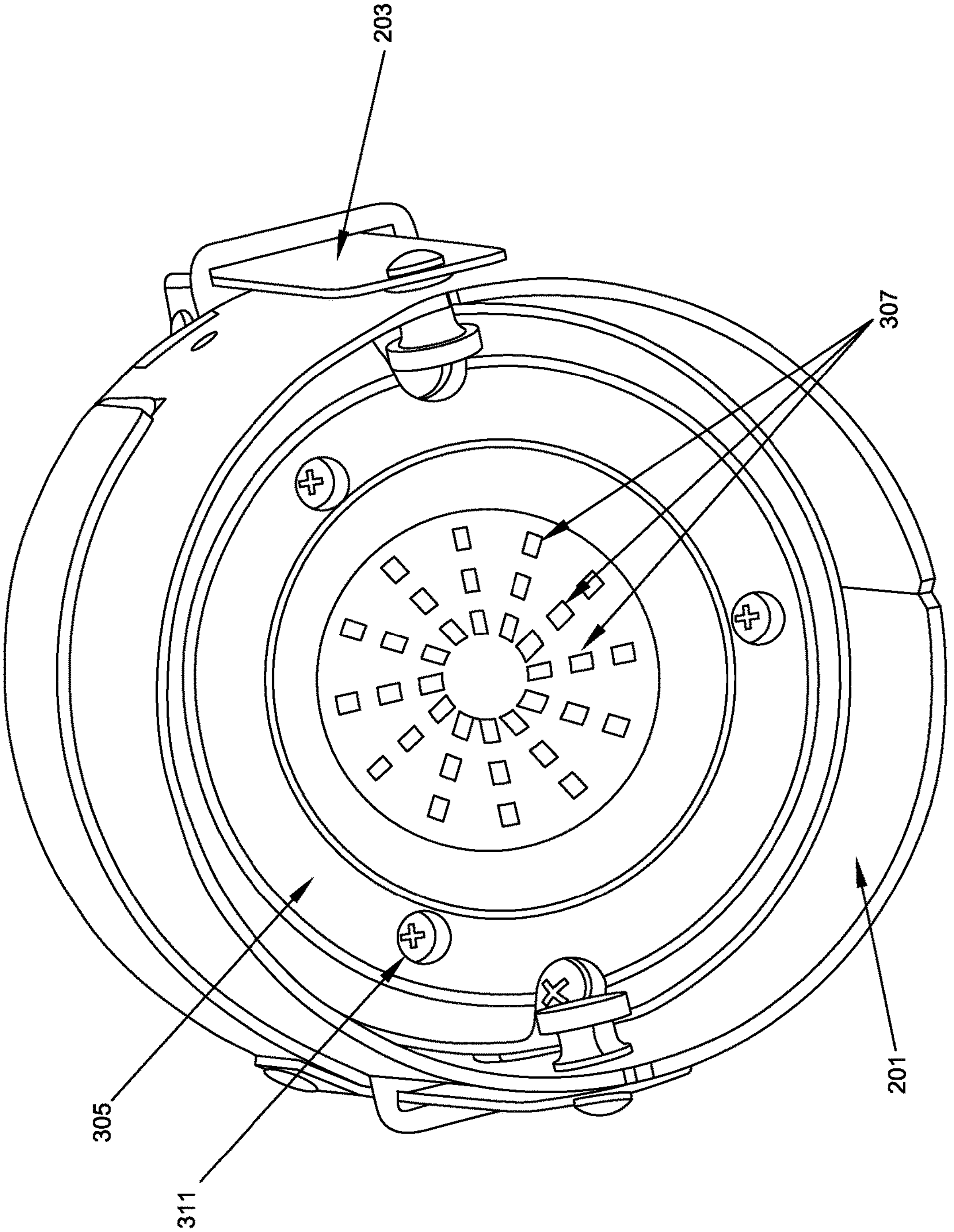
FIG. 5B is a bottom interior perspective view of the housing having the light emitting module installed therein in accordance with various embodiments.
Figure 5C:
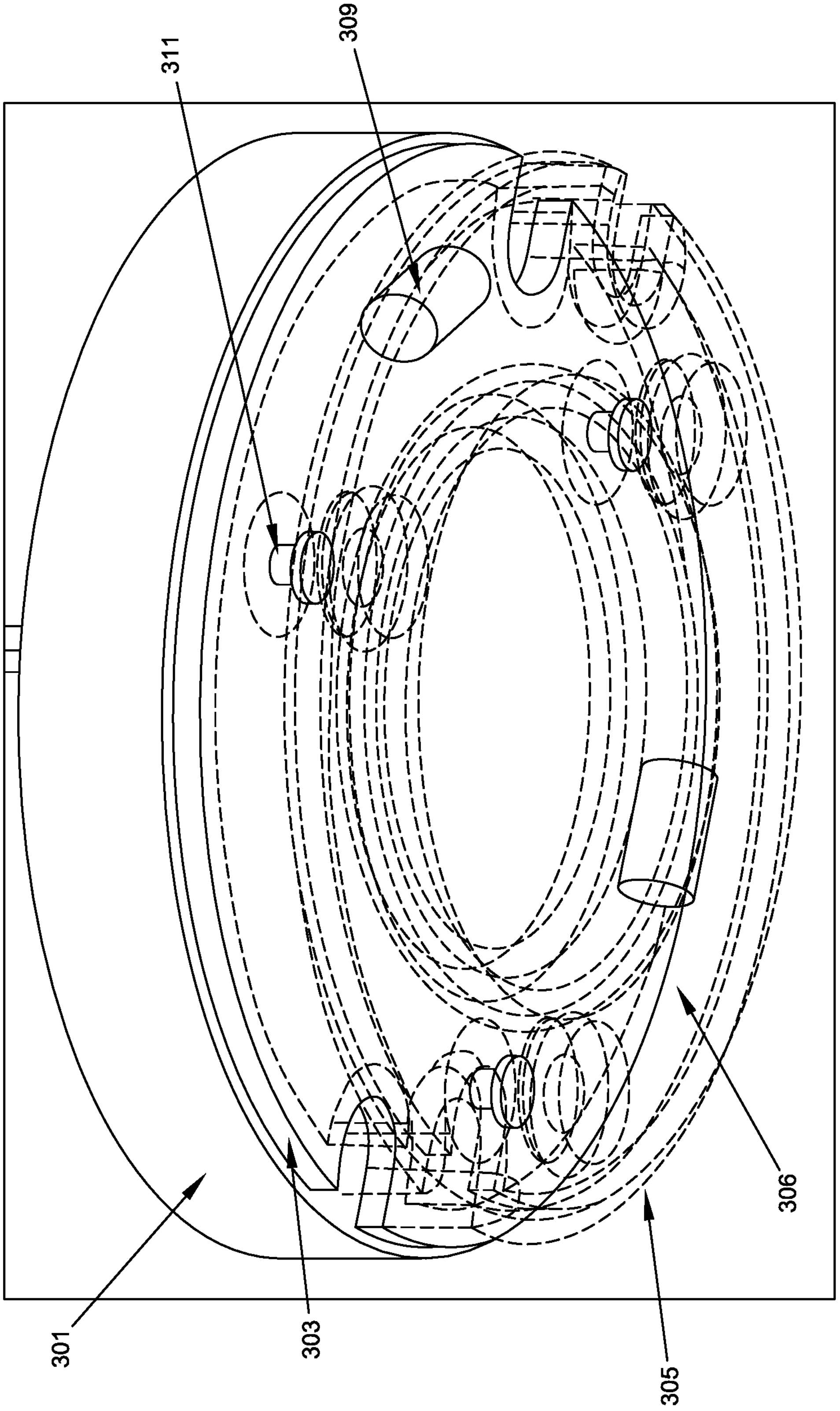
FIG. 5C is a bottom perspective view of the light emitting module in accordance with various embodiments.

As best shown in FIGS. 5A and 5C, the heat sink 301 can generally have a cylindrical or "puck" shape. However, it will be apparent in view of this disclosure that any shaped heat sink can be used in accordance with various embodiments. That is, in addition to the round cross-section of the illustrated cylindrical heat sink 301, in some embodiments the heat sink can have a cross-section of any suitable shape, including, for example, square, rectangular, hexagonal, octagonal, elliptical, or any other suitable shape. In some embodiments, the shape of the heat sink 301 can be selected to match a cross-sectional shape of the housing 201 or to be different than the shape of the housing 201. The heat sink 301 can be constructed from any suitable heat-conducting material, including, for example, metals such as copper, aluminum, brass, steel, including stainless steel, iron, combinations or alloys thereof, or any other suitable material.

Figure 7:
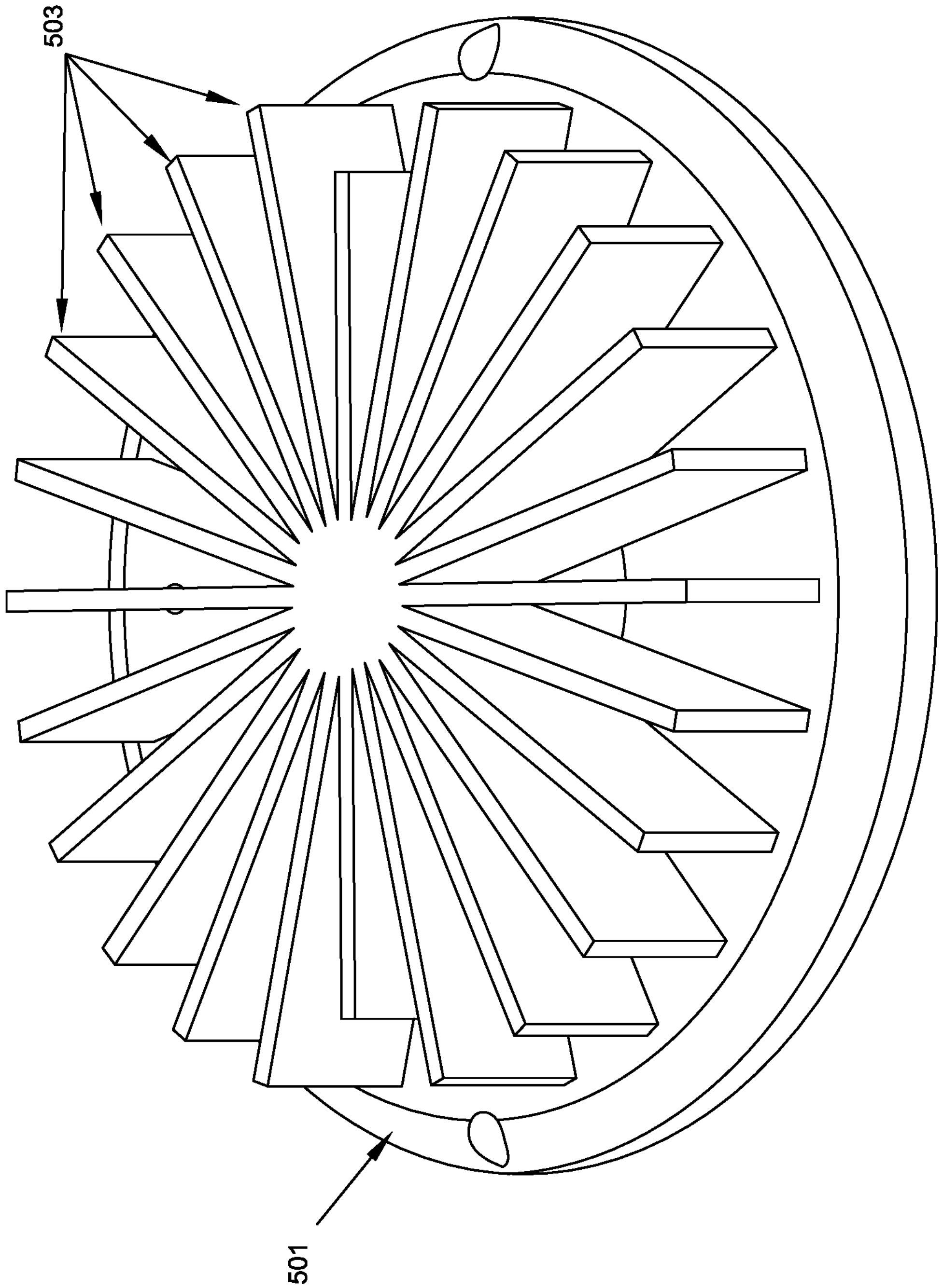
FIG. 7 is a perspective view of a heat sink in accordance with various embodiments.
Figure 8:
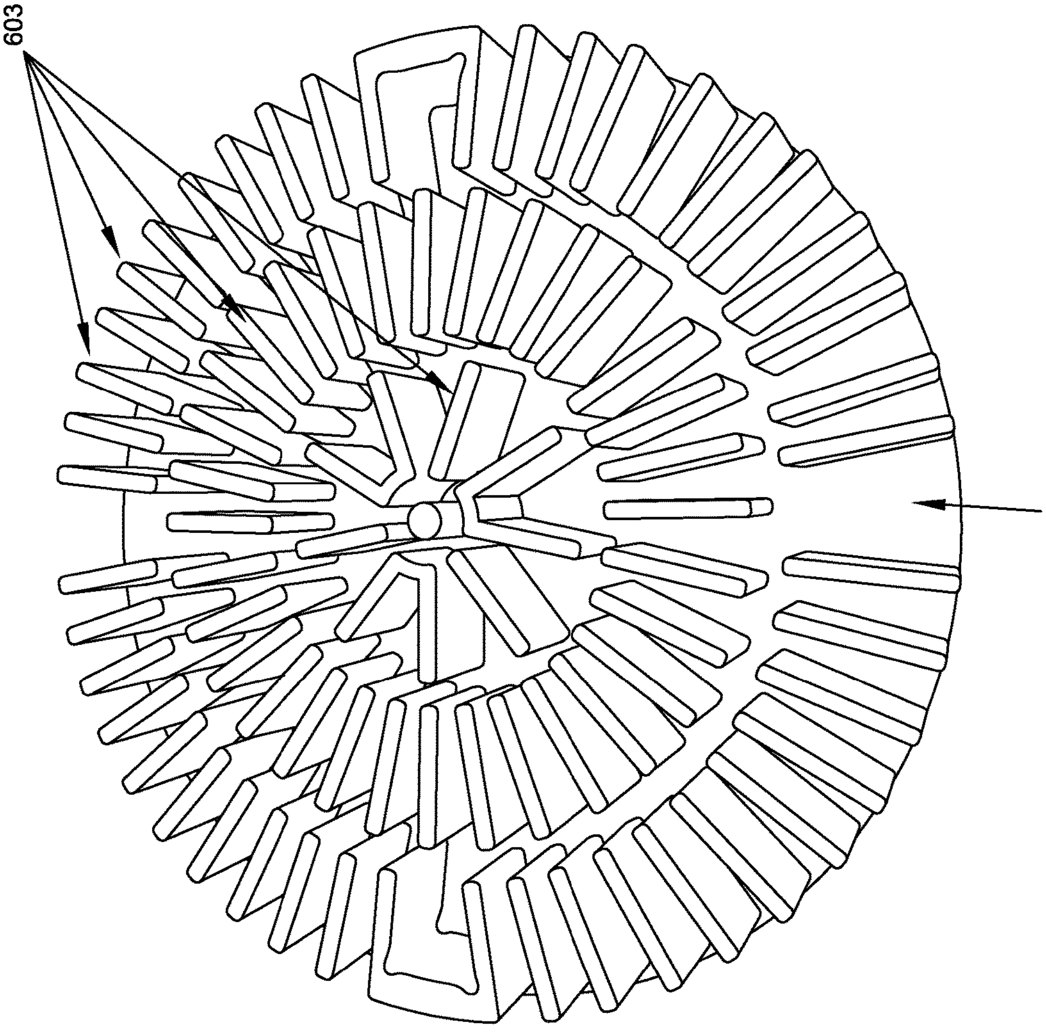
FIG. 8 is a perspective view of an alternative heat sink in accordance with various embodiments.
Figure 9:
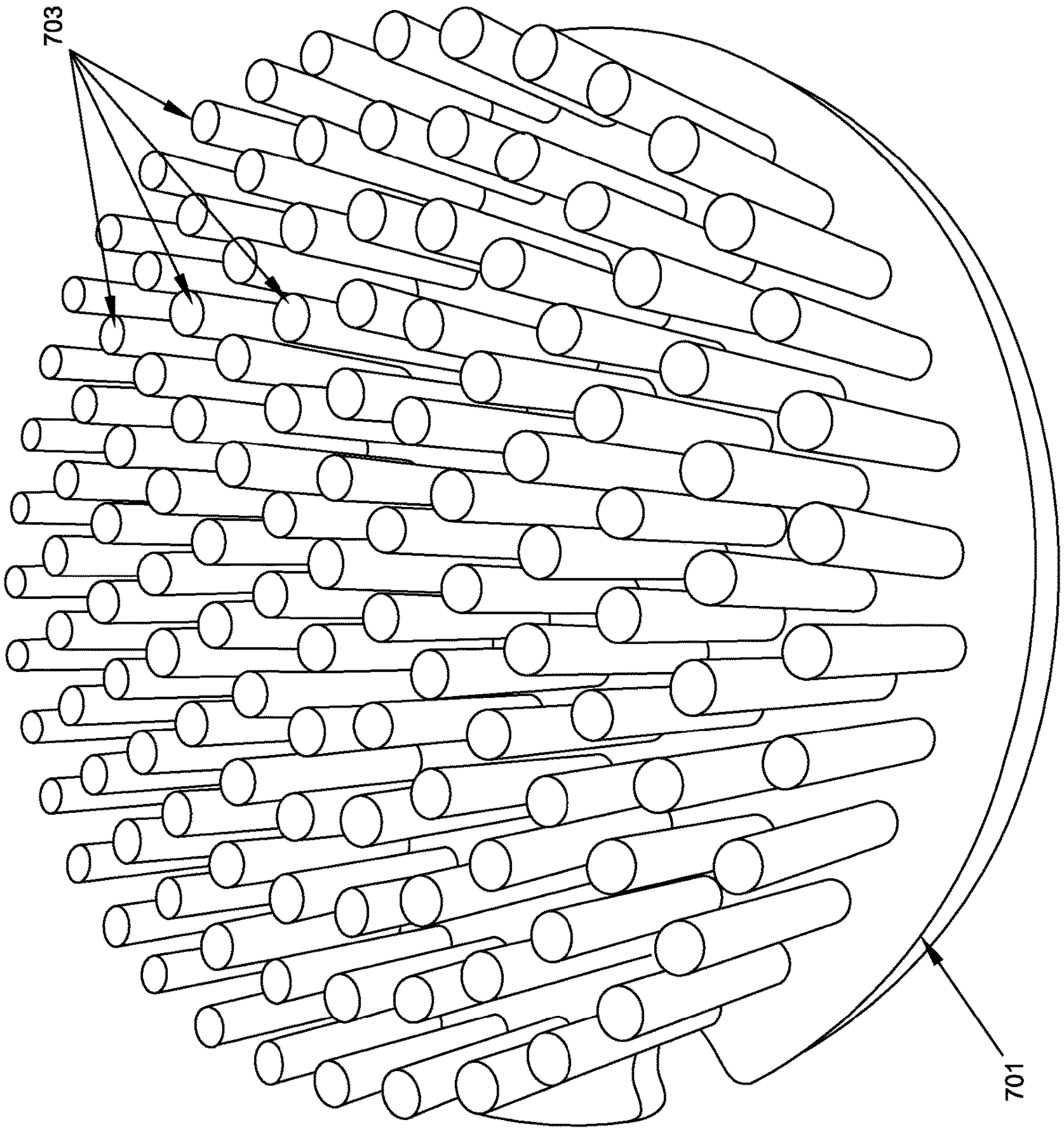
FIG. 9 is a perspective view of another heat sink in accordance with various embodiments.

In addition, to the extent that additional cooling or heat-transferring performance is desirable, the heat sink 301 can be configured to include one or more heat dissipating elements. Such heat dissipating elements can generally be formed on an opposite surface of the heat sink 301 from the stacked circuit board 303. The heat dissipating elements can take any desired form suitable for increasing the cooling performance of the heat sink. For example, in some embodiments, as shown in FIG. 7, heat sinks 501 can include heat dissipating elements taking the form of interconnected fins 503. In some embodiments, as shown in FIG. 8, heat sinks 601 can include heat dissipating elements taking the form of concentric rings of freestanding fins 603. In some embodiments, as shown in FIG. 9, heat sinks 701 can include heat dissipating elements taking the form of a plurality of pins 703. In addition, it will be apparent in view of this disclosure that any configuration or combination of heat dissipating elements can be used in accordance with various embodiments.

Referring again to FIGS. 5A-5C, the circuit board 303 can be constructed from any suitable circuit board capable of receiving electrical components mounted thereon such as, for example, a printed circuit board (PCB). As best shown in FIG. 5C, the circuit board 303 can generally include a plurality of electrical components 309 mounted thereon opposite the heat sink 301. Such electrical components 309 can include, for example, a driver and/or other electronics used for conditioning an electrical signal and/or operating the LEDs 307. In addition, as shown in FIG. 5B, the LEDs 307 are also mounted to the circuit board 303 and can generally be operatively electrically connected to the electrical components 309. As best shown in FIGS. 5B and 5C, the LEDs 307 can generally be concentrated in an array substantially at a center of the circuit board 303. The other electrical components 309 can then generally be arranged to surround the LEDs 307.

The cover 305, can generally be constructed of a thermally and/or electrically insulating material such as, for example, glass, plastic, PVC, fiberglass, or any other suitable such material. The cover 305 can include a channel 306 extending around the cover 305 sized and shaped to enclose the electronic components 309 within the channel 306 of the cover 305 when the cover 305 is assembled into the light module. In this manner, the cover protects a user or installer from electrical shock from direct physical contact with the electrical components 309. In addition, the channel 306 of the cover 305 separates the LEDs 307 from the other electronic components 309. In this manner, the LEDs 307 are at least partially thermally insulated from the other electronic components 309 by the cover 305, thereby improving performance and increasing the useful life of the LEDs 307. Accordingly, the conventional need for a separate housing for the driver is obviated because the heat from the driver has less impact on the LEDs 307.

The cover 305 can also define an opening at a center portion thereof such that the LEDs 307 are not covered by the channel 306 or the cover 305. However, by not covering the LEDs 307, the risk of electrical shock from contact with the exposed LEDs 307 must be mitigated in order to meet the requirements of electrical and fire codes. The present invention avoids this challenge because the LEDs 307 are selected such that the light emitting portion of the LEDs 307 covers the live electrical connectors (solder pads) on which they are mounted. Those LEDs 307 are then concentrated at the center of the circuit board 303 closely together enough that the live connectors are substantially covered and shielded by the light emitting portions of the LEDs 307 themselves from contact by the user or installer.

This uncovered configuration advantageously increases the amount of light transmissible from the LEDs 307 into the space to be illuminated. In particular, in a conventional lighting system the entire circuit board, including LEDs, would need to be covered by the cover in order to prevent the risks of electric shock and fire. However, even transparent covers result in a loss of about 7% of the light passing therethrough. Therefore, an immediate 7% increase in the amount of light transmissible into the space to be lighted is achieved by configuring the light emitting module 300 as described herein to leave the LEDs 307 uncovered. This increase in transmissible light permits the lighting system 10 described herein to provide better illumination while consuming less power than a conventional recessed lighting system.

Figure 6A:
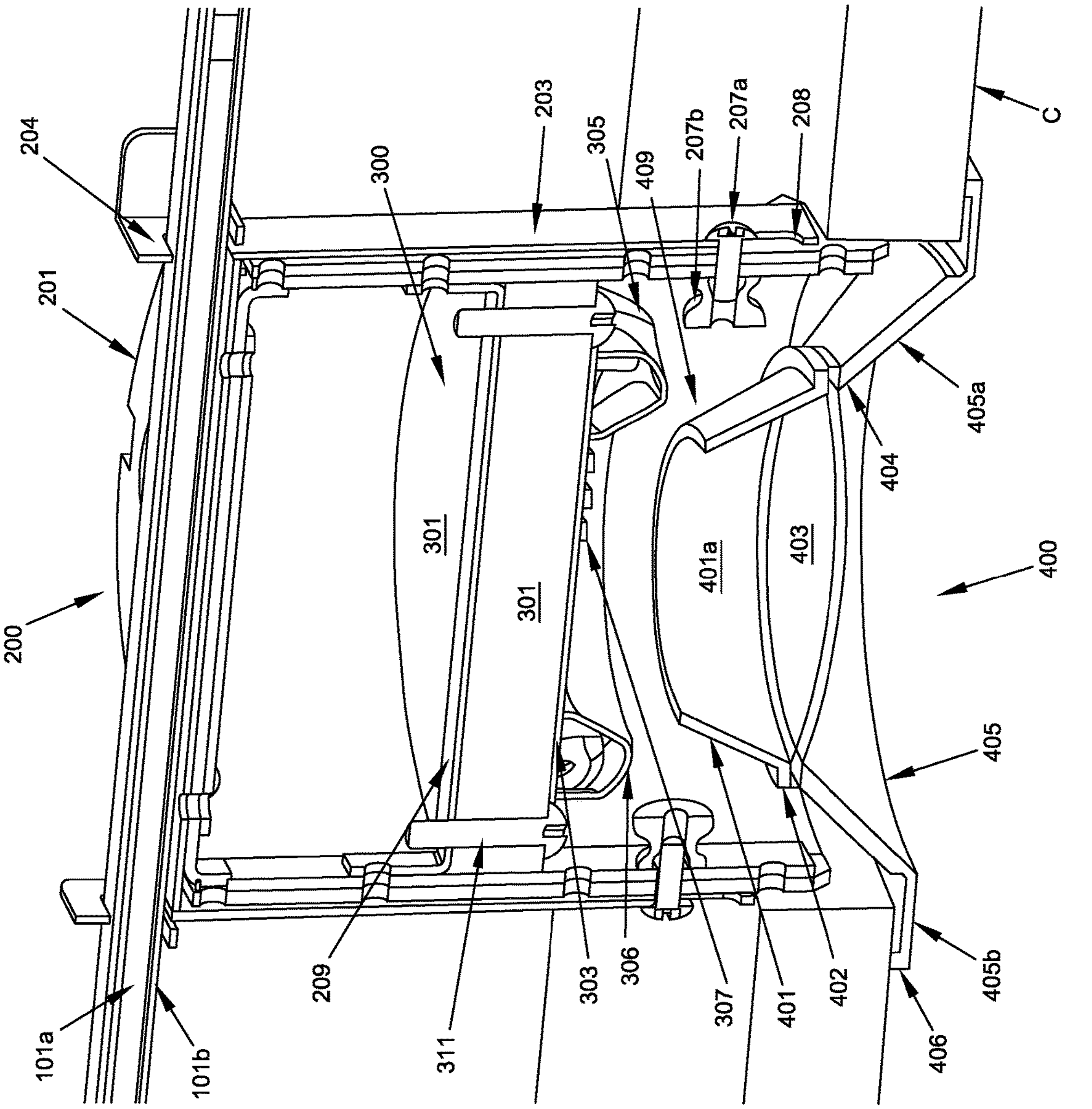
FIG. 6A is a cross-sectional view of the housing having a trim assembly removably installed therein in accordance with various embodiments.
Figure 6B:
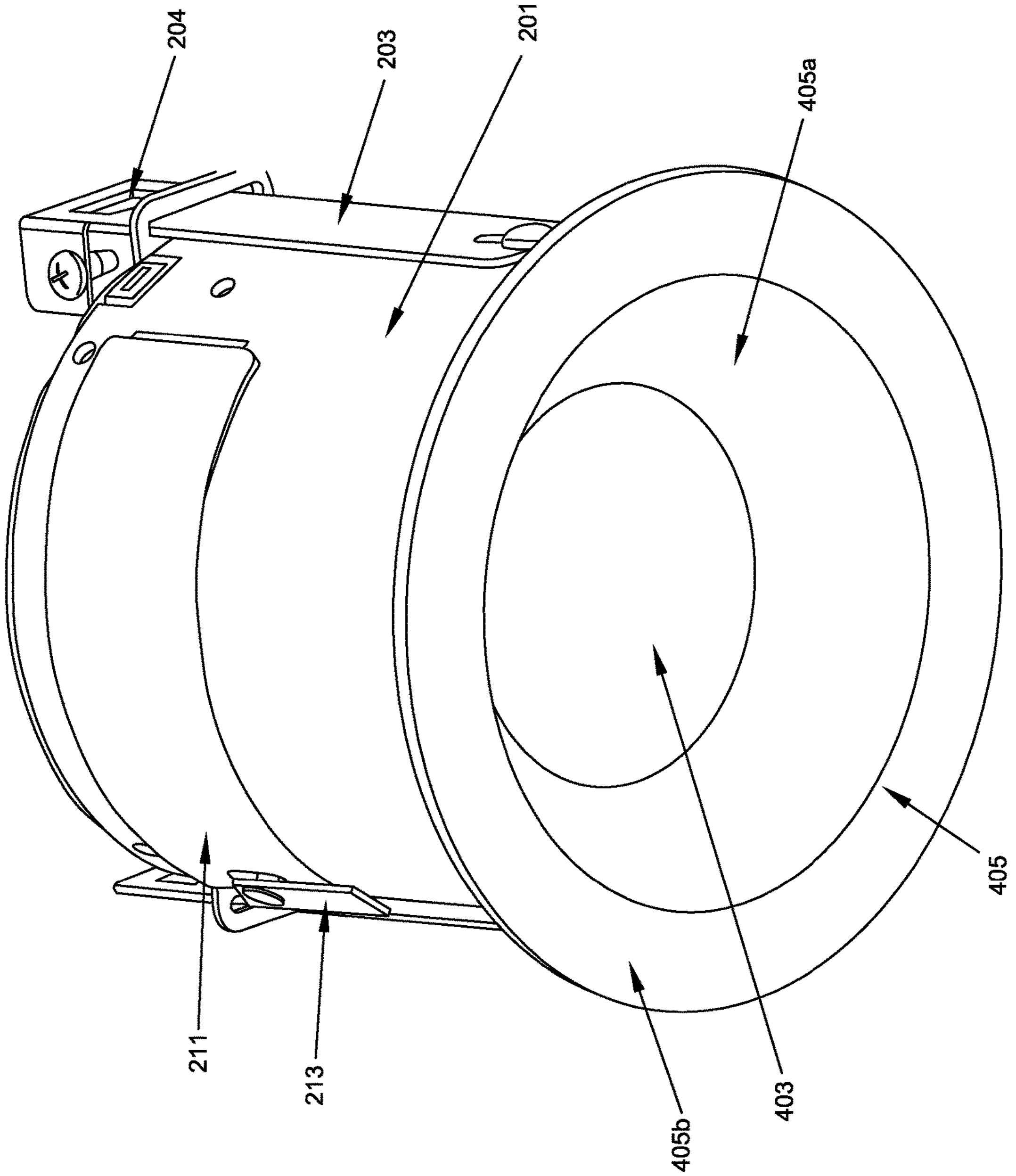
FIG. 6B is a bottom interior perspective view of the housing having a trim assembly removably installed therein in accordance with various embodiments.
Figure 6C:
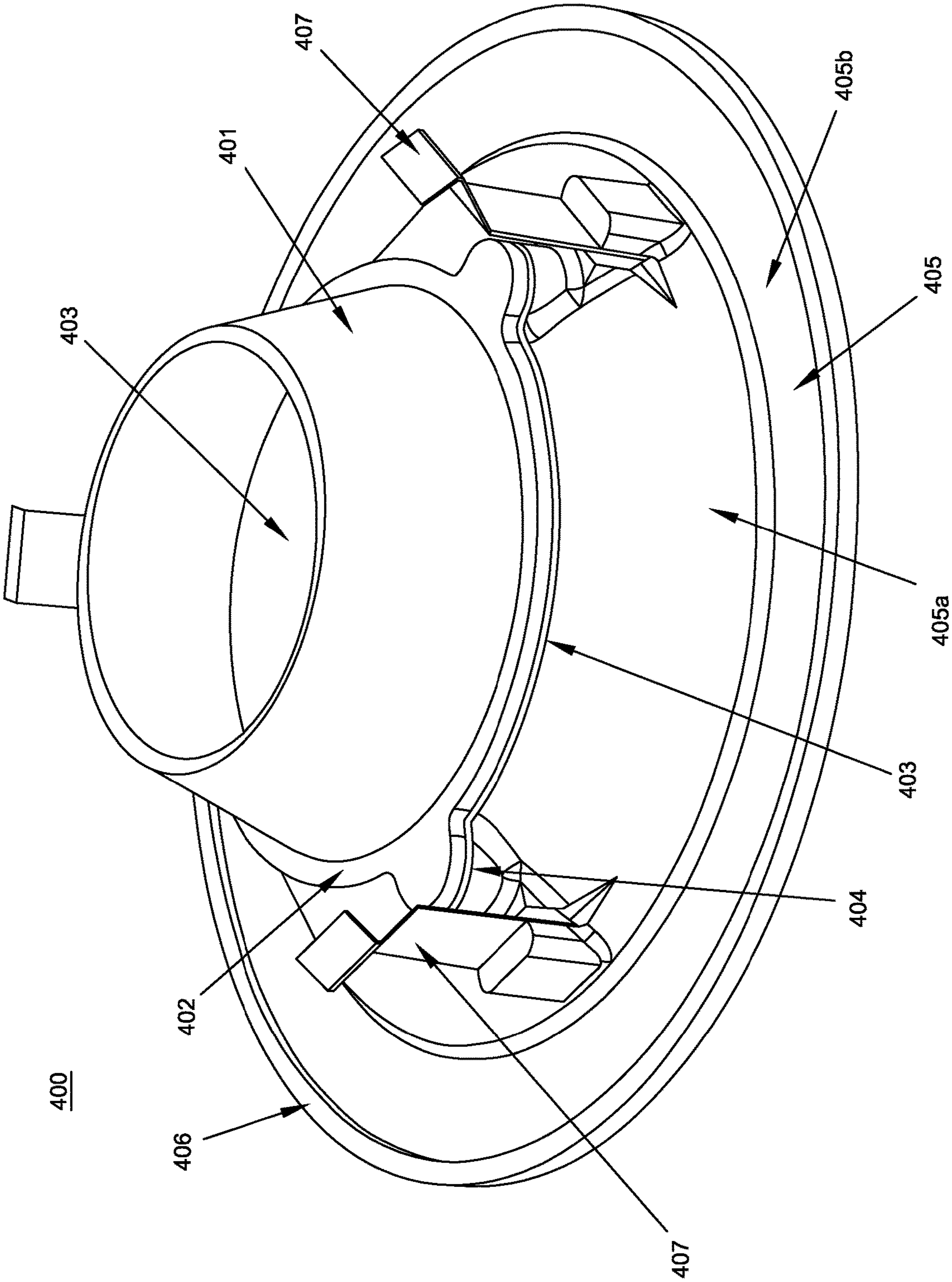
FIG. 6C is a perspective view of the trim assembly in accordance with various embodiments.

Referring now to FIGS. 6A-6C, once the hanger bar 100 and hanger brackets 103 have been installed in the ceiling C or wall, the housing assembly 200 has been positioned in an opening of the ceiling C or wall (e.g., as shown in FIGS. 2A-2F), and the light emitting module 300 has been wired into mains, a trim assembly 400 can be provided for installation into the housing 201 through the ceiling C or wall. The trim assembly 400, in accordance with various embodiments, can generally be a stacked assembly including a reflector 401, a trim 405, and a lens 403 retained between the reflector 401 and the trim 405.

The reflector 401 can include a hollow, frustoconical (e.g., as shown in FIGS. 6A-6C) or frustopyramidal structure for guiding light emitted by the LEDs 307 through the lens 403 toward the space to be illuminated. In particular, when the trim assembly 400 is installed in the housing 201, the opening of the frustum of the reflector 401 can preferably be positioned proximate to the LEDs 307 and have a diameter sufficient to capture light emitted from each of the LEDs 307 in order to guide the light emitted by the LEDs 307 away from the LEDs 307 and into the space to be illuminated. In that regard, although in some embodiments the diameter of the opening of the frustum may be less than a diameter of the opening in the cover 305 of the light emitting module 300, in general the diameter of the frustum is expected to match or exceed the diameter of the opening in the cover 305 of the light emitting module 300.

In accordance with various embodiments, a frustum and a base of the reflector 401 can have any suitable shape including, for example, square, rectangular, hexagonal, octagonal, elliptical, or combinations thereof. In addition, it will be apparent in view of this disclosure that the shape of the frustum of the reflector 401 can, in some embodiments, match a cross-sectional shape of at least one of the housing 201, the heat sink 301, or the trim 405 or may be a different shape. In addition, it will be apparent in view of this disclosure that the frustum and the base of the reflector 401 may have a same shape or a different shape. The base of the reflector 401, in some embodiments, can include a base flange 402 to facilitate assembly to the lens 403 and the trim 405 (e.g., to frustum flange 404) as described in greater detail below.

The reflector 401 can be constructed of any suitable material including, for example, metallic materials (e.g., aluminum, steel, including stainless steel, cast iron, bronze, brass), non-metallic materials (e.g., plastic, PVC, fiberglass), or combinations thereof. An interior surface of the reflector 401 can generally be configured as a reflective surface 401*a*. The reflective surface 401*a* can be configured to reflect light. In some embodiments, the reflective surface 401*a* can be constructed from the same material as the reflector 401 more generally and polished or burnished to increase reflectivity (e.g., polished aluminum, steel, or stainless steel). In other embodiments, a reflective coating can be applied to the reflector 401 in order to render the reflective surface 401*a* more reflective. Such coatings can include any suitable reflective coating, including, for example, silver, Mylar®, aluminum foil, reflective paint, or combinations thereof.

The lens 403 can be any optical medium through which light emitted by the LEDs 307 can be transmitted. For example, the lens 403 can be constructed of any transparent or translucent material such as, for example, acrylic, polycarbonate, glass, other transparent or translucent materials, or combinations thereof. The lens 403 can also be clear, white, or any other desired color. The lens 403 can also be configured to shape and/or distribute the light emitted by the LEDs 307 and lighting system 10 more generally. Accordingly, the lens 403 can be, for example, flat, concave, convex, Fresnel, compound, or any other suitable shape. In addition, the lens 403, as used herein, can also include diffusers, prismatic lenses, and louvers. Furthermore, although uncommon, it will be apparent in view of this disclosure that some trim assemblies 400 may not include a lens 403, such that the light emitted from the LEDs 307 passes directly through the reflector 401 and the trim 405 into the space to be illuminated.

The trim 405 can be configured for decorative purposes in order to cover the opening in the ceiling in which the housing 201 is suspended. The trim 405 can generally be a single piece including a light guide 405*a* and a decorative trim 405*b*. The trim 405 can be constructed of any suitable material including, for example, metallic materials (e.g., aluminum, steel, including stainless steel, cast iron, bronze, brass), non-metallic materials (e.g., plastic, PVC, fiberglass), or combinations thereof. In accordance with various embodiments, the trim 405 can be constructed of same and/or different materials than the reflector 401 and lens 403.

The light guide 405*a* can preferably be constructed as an extension of the reflector 401 in that it can be at least partially inserted into the housing 201 and can include a hollow, frustoconical (e.g., as shown in FIGS. 6A-6C) or frustopyramidal structure for guiding light emitted through the lens 403 toward the space to be illuminated. In accordance with various embodiments, a frustum and a base of the light guide 405*a* can have any suitable shape including, for example, square, rectangular, hexagonal, octagonal, elliptical, or combinations thereof. It will be apparent in view of this disclosure that the shape of the frustum of the light guide 405*a* can, in some embodiments, match a cross-sectional shape of the base of the reflector 401 to facilitate assembly to the lens 403 and the reflector 401 (e.g., to base flange 402) as described in greater detail below. In addition, it will be apparent in view of this disclosure that the frustum and the base of the light guide 405*a* may have a same shape or a different shape.

An interior surface of the light guide 405*a*, in some embodiments, can be configured as a reflective surface and/or a non-reflective decorative surface. Where the interior surface is reflective, it can be configured to reflect light and, similar to the reflective surface 401*a* of the reflector 401, the interior surface of the light guide 405*a* can be constructed from the same material as trim more generally and polished or burnished to increase reflectivity (e.g., polished aluminum, steel, or stainless steel). In other embodiments, a reflective coating can be applied to the interior surface of the light guide 405*a* in order increase reflectivity. Such coatings can include any suitable reflective coating, including, for example, silver, Mylar®, aluminum foil, reflective paint, or combinations thereof.

Where the interior surface of the light guide 405*a* is non-reflective, the interior surface can be any suitable color, tone, or texture as desired for decorative purposes. In some embodiments, the color, tone, and texture can match a color, tone, or texture or the decorative trim 405*b* or can be different than the color, tone, or texture of the decorative trim 405*b*. In that regard, in various embodiments the interior surface of the light guide 405*a* can include bare material, polished material, burnished material, painted, powder coated, oiled (e.g., as in oil rubbed bronze), painted (e.g., as in antique bronze, brass, or copper), textured, or any other feature affecting a color, tone, or texture of the interior surface of the light guide.

The decorative trim 405*b* can extend radially outward from the base of the light guide 405*a*, substantially parallel to the ceiling C or wall in order to cover/hide the opening in the ceiling C or wall in which the housing 201 is suspended. The decorative trim 405*b* can extend to any diameter, in any desired decorative shape although, as noted above, preferably, the diameter and shape of the decorative trim 405*b* are sufficient to cover/hide the opening in the ceiling C or wall in which the housing 201 is suspended. Consistent with the decorative nature of the decorative trim 405*b*, in various embodiments the interior surface of the light guide 405*a* can be any material tone, texture, or color, including, for example, bare material, polished material, burnished material, painted, powder coated, oiled (e.g., as in oil rubbed bronze), painted (e.g., as in antique bronze, brass, or copper), textured, or any other feature affecting a color, tone, or texture of the interior surface of the light guide.

In some embodiments, the decorative trim 405*b* can also include a lip 406 extending substantially perpendicular to an outer edge of the decorative trim 405*b* toward the ceiling C or wall. The lip 406 can be configured to contact the ceiling C or wall, thereby creating an impression to a viewer inside the space to be illuminated of a visually appealing, substantially gap-free interface between the decorative trim 405*b* and the ceiling C or wall while maintaining a space between the ceiling C or wall and the decorative trim 405*b*. The spacing created by the lip 406 advantageously prevents unsightly gaps between the decorative trim 405*b* and the ceiling C or wall. In particular, for example, where the housing 201 may be installed imperfectly such that it protrudes slightly below the ceiling C or wall and into the space to be illuminated, the spacing created by the lip 406 accommodates the protruding housing 201 without creating gaps in the fit between the ceiling C or wall. Conversely, were the decorative trim 405*b* designed to achieve a flush fit with the ceiling C or wall and the housing 201 protruded below the ceiling C or wall, the protruding housing 201 would create a gap between the decorative trim 405*b* and the ceiling C or wall.

The trim assembly 400 can be assembled, in some embodiments, by sandwiching an outer perimeter of the lens 403 between at least a portion of the base flange 402 of the reflector 401 and at least a portion of the frustum flange 404 of the light guide 405*a* portion of the trim 405. The base flange 402, frustum flange 404, and lens 403 can be removably or permanently fastened together by any suitable means including, for example, bolting, clamping, taping, gluing or other adhesive bonding, welding, combinations thereof.

The trim assembly 400 can also include a plurality of interface elements 407. Interface elements 407 can be mounted on an exterior surface of the light guide 405*a* portion of the trim 405 and/or an exterior surface of the reflector 401. The interface elements 407, as shown in FIGS. 6A and 6C can be cantilevered springs configured to deform radially inward during insertion of the trim assembly 400 into the housing 201 and for at least a portion thereof to press circumferentially outward onto an interior surface of the housing 201 to create a friction fit therewith, thereby retaining the trim assembly 400 inside the housing 201. It will be apparent in view of this disclosure that in some embodiments additional features can be provided to aid retention of the housing assembly. For example, in some embodiments one or more detents may be provided along the interior surface of the housing 201 to capture a portion of the interface elements 407.

Figure 10A:
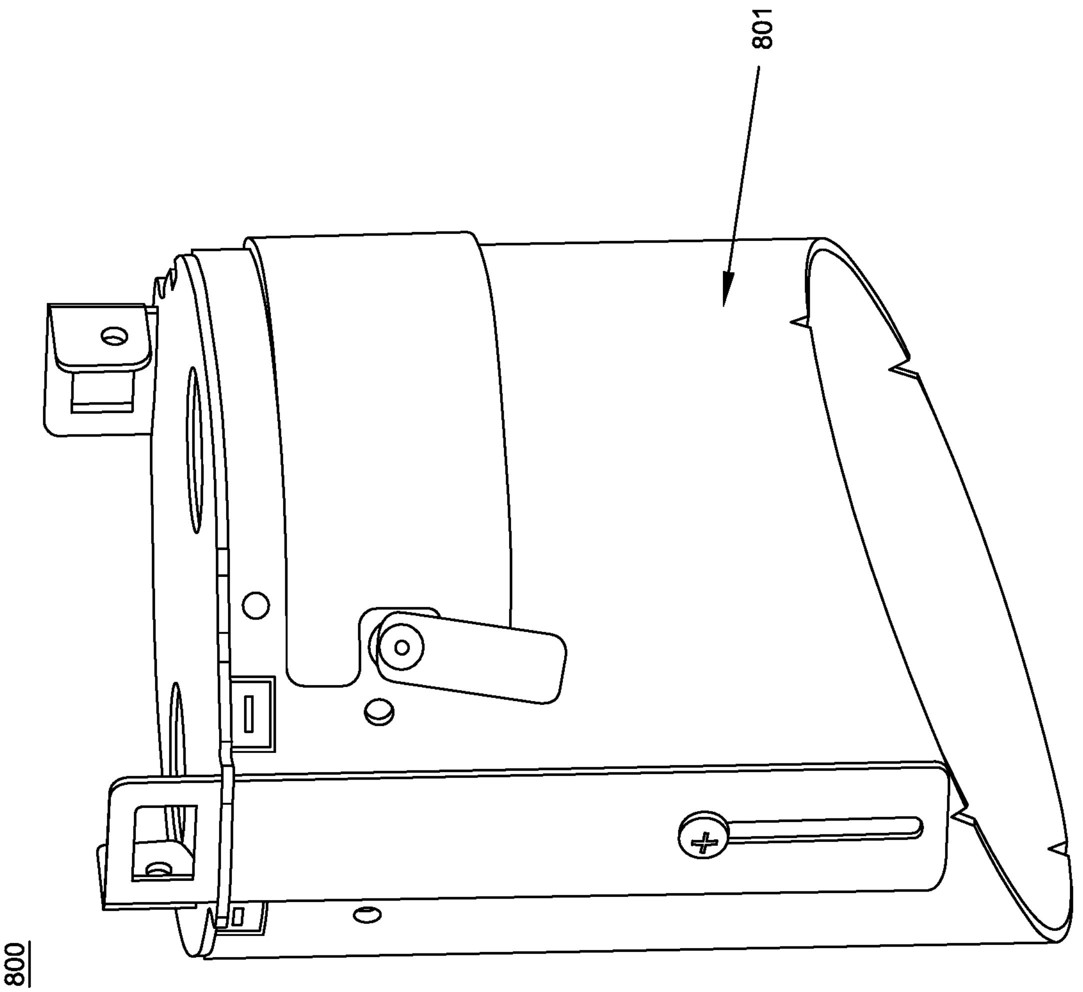
FIGS. 10A-10B are side perspective views of angled housings in accordance with various embodiments.
Figure 10B:
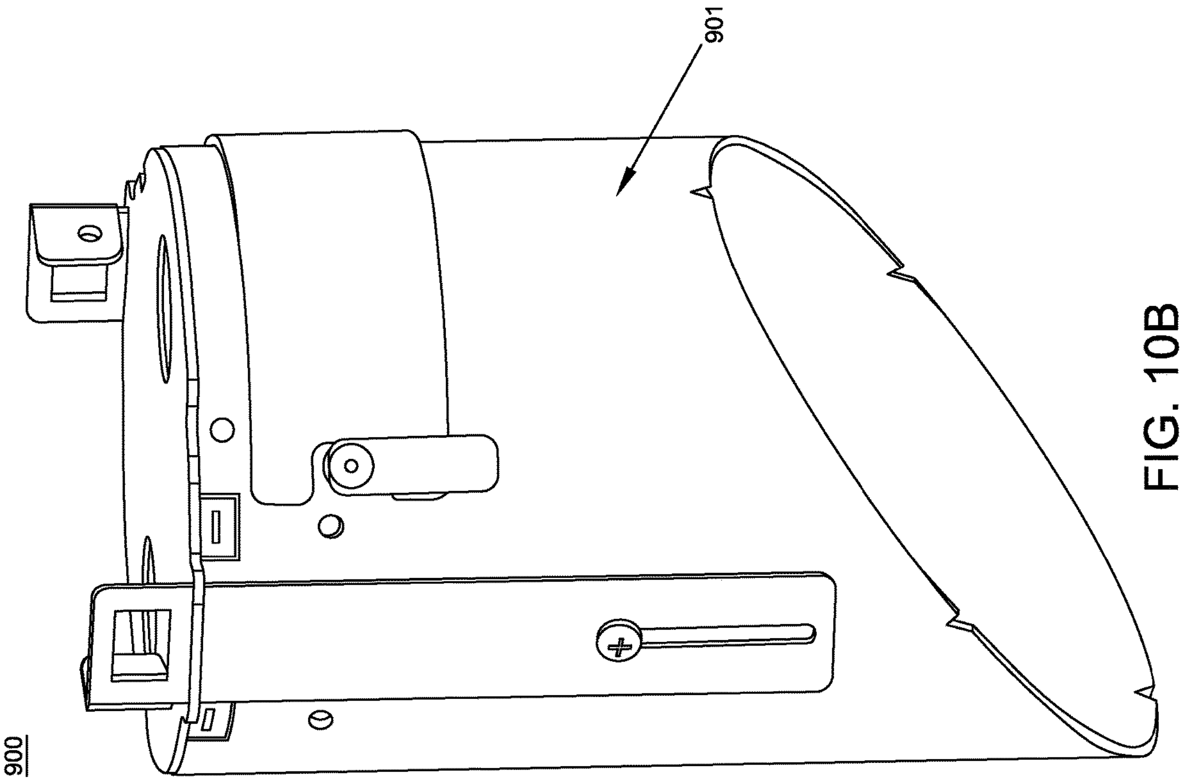

Referring now to FIGS. 10A and 10B, in some embodiments, lighting systems 10 having angled housing assemblies 800, 900 are provided and may include a housing 801, 901 having an angled lower surface for insertion into an opening in an angled ceiling or wall. Although the angled housings 801, 901 can be provided to have any suitable angle to exactly match a corresponding ceiling pitch, such an approach may be commercially impractical. However, it is generally desirable to maintain a light beam directionality as close to perpendicular as possible to the floor or opposing wall and not more than 10° off-perpendicular. Accordingly it may be desirable to provide angles between common ceiling angles. For example, FIG. 10A illustrates a housing assembly 800 having a housing 801 wherein the lower surface is cut at an angled of 22.5° for use in connection with a ceiling pitch between 15°-30° and FIG. 10B illustrates a housing assembly 900 having a housing 901 wherein the lower surface is cut at an angled of 37.5° for use in connection with a ceiling pitch between 30°-45°.

Figure 11:
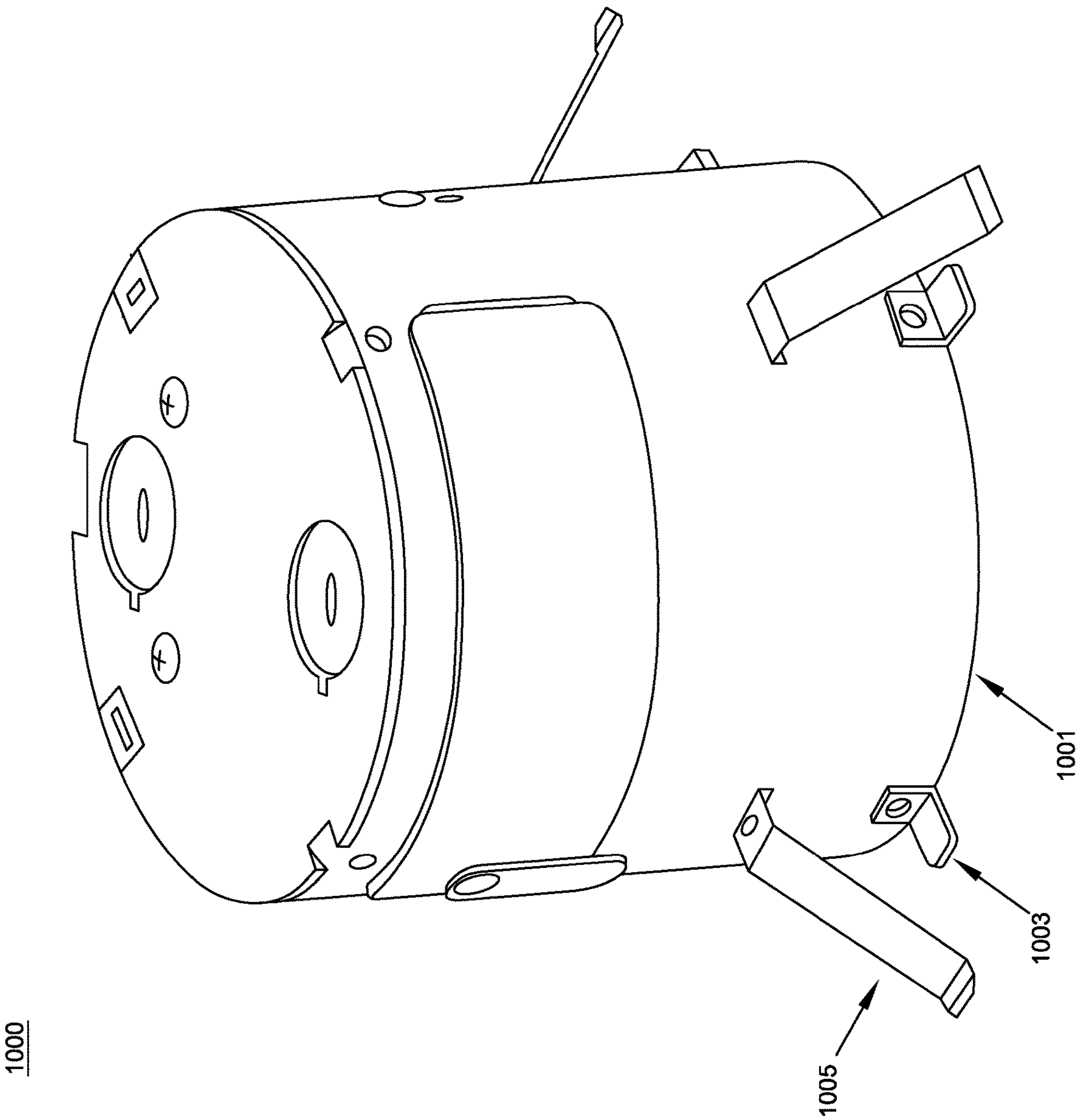
FIG. 11 is a perspective view of an adjustable, single-housing recessed lighting system for use in a remodel installation in accordance with various embodiments.

In some embodiments (e.g., where the lighting system 10 is being used for a remodel, rather than new construction) it is desirable to install a new lighting system 10 in a preexisting opening in the ceiling or wall. However, in such applications, access to structural elements such as studs or joists may not be available, thus eliminating the option of using a hanger bar 100. Referring now to FIG. 11, in some embodiments a remodel housing assembly 1000 can be provided including stop brackets 1003 and collapsible vertical retainers 1005 extending radially outward from a housing 1001. In such embodiments the housing assembly 1000 can be configured to be inserted directly into the ceiling or wall via the existing opening. Upon insertion, the vertical retainers 1005 bend or hingeably rotate circumferentially inward ("collapse") toward the housing 1001 to permit insertion through the hole and into the ceiling or wall. Once each vertical retainer 1005 passes through the ceiling or wall it springs circumferentially outward, thereby creating a support for retaining the housing 1001 within the ceiling or wall. The stop brackets 1003 are positioned to permit the vertical retainers 1005 to pass through the ceiling and spring outward while preventing over-insertion of the housing 1001 into the ceiling so that at least a portion of the housing 1001 remains positioned in the opening, thereby maintaining proper spacing between the installed trim assembly 400 and the light emitting module 300.

While the foregoing description of the invention enables one of ordinary skill to make and use what is considered presently to be the best mode thereof, those of ordinary skill will understand and appreciate the existence of variations, combinations, and equivalents of the specific embodiments and examples herein. The above-described embodiments of the present invention are intended to be examples only. Alterations, modifications and variations may be effected to the particular embodiments by those of skill in the art without departing from the scope of the invention, which is defined solely by the claims appended hereto. The invention is therefore not limited by the above described embodiments and examples.

What is claimed is:

1. A recessed lighting system comprising:

a housing having a closed rear face, an opposing open face, and a sidewall extending between the closed rear face and the opposing open face to define an interior cavity;

a light emitting module positioned inside the interior cavity of the housing, including:

a heat sink;

a circuit board stacked on the heat sink;

a light source mounted at a center of the circuit board on a side of the circuit board opposite the heat sink;

driver circuitry mounted on a portion of the circuit board surrounding the light source, the driver circuitry configured for powering the light source; and a cover stacked on the circuit board including a channel sized and positioned to enclose the driver circuitry and defining an opening sized and positioned such that the light source is not covered by any cover of the light emitting module; and a trim assembly installed in the housing through the open face, including:

a reflector;

a trim having a light guide portion fastened to the reflector and a decorative trim extending radially outward from a base of the light guide portion; and a plurality of interface elements extending from an exterior surface of the reflector or an exterior surface of the light guide portion of the trim, the interface elements configured to exert a radial force on an interior surface of sidewall of the housing to retain the trim assembly in the housing.

2. A recessed lighting system comprising:

a housing assembly including:

a housing having a closed rear face, an opposing open face, and a sidewall extending between the closed rear face and the opposing open face to define an interior cavity; and first and second brackets engaged with opposing exterior sides of the housing, the first and second brackets each configured to selectively slide along a vertical axis of the housing to permit adjustment of a height of the brackets relative to the housing;

a light emitting module positioned inside the cavity of the housing; and a trim assembly installed in the housing through the open face, including:

a reflector; and a trim fastened to the reflector; and a length-adjustable hanger bar for suspending the housing between two structural building elements, the length-adjustable hanger bar extending through first and second slots formed, respectively, in an end of each of the first and second brackets proximate the closed rear face of the housing, wherein a position of the housing can be adjusted laterally relative to an opening in a ceiling or wall by sliding the housing, through the slots, along the length-adjustable hanger bar, and wherein a position of the housing can be adjusted vertically relative to the opening in the ceiling or wall by adjusting a height of the brackets relative to the housing.

3. A lighting enclosure comprising:

a housing having:

a closed rear face, an opposing open face, and a sidewall extending between the closed rear face and the opposing open face to define an interior cavity, an aperture formed in the sidewall proximate the closed rear face, located between the closed rear face and the open face, and sized to permit exterior wiring access to a portion of the interior cavity, a door hingeably attached to the sidewall, the door sized and positioned to cover the aperture in a closed position of the door;

a light emitting module installed in the housing between the open face and the closed rear face; and wherein:

the housing and the door together form a fire-rated housing; and the portion of the interior cavity is defined as between the light emitting module and the closed rear face.

4. The lighting enclosure of claim 3, wherein the fire-rated housing is a junction box.

5. The lighting enclosure of claim 3, wherein the fire-rated housing is constructed of at least one of aluminum, steel, stainless steel, cast iron, a metallic alloy, plastic, PVC, fiberglass, or combinations thereof.

6. The lighting enclosure of claim 3, further comprising a latch configured to selectively retain the door in a closed position of the door.

7. The lighting enclosure of claim 6, wherein the latch is a rotatable element attached to the sidewall and positioned to rotate between a retention position wherein the latch covers a portion of the door in the closed position of the door and a release position wherein the latch does not cover the door in the closed position of the door.

8. The lighting enclosure of claim 3, wherein the light emitting module further comprises:

a heat sink;

a circuit board stacked on the heat sink;

a light source mounted at a center of the circuit board on a side of the circuit board opposite the heat sink;

driver circuitry mounted on a portion of the circuit board surrounding the light source, the driver circuitry configured for powering the light source; and a cover stacked on the circuit board including a channel sized and positioned to enclose the driver circuitry and defining an opening sized and positioned such that the light source is not covered by the cover.

9. The lighting enclosure of claim 3, further comprising a trim assembly installed in the fire-rated housing through the open face, including:

a reflector;

a trim fastened to the reflector; and a plurality of interface elements extending from an exterior surface of the reflector or an exterior surface of the light guide portion of the trim, the interface elements configured to exert a radial force on an interior surface of the housing to retain the trim assembly in the housing.

10. A recessed lighting system comprising:

a housing assembly including:

a fire-rated housing having a closed rear face, an opposing open face, and a sidewall extending between the closed rear face and the opposing open face to define an interior cavity; and an aperture formed in the sidewall proximate the closed rear face, the aperture sized to permit exterior access to a portion of the interior cavity defined between the light emitting module and the closed rear face; and a door hingeably attached to the sidewall, the door sized and positioned to cover the aperture in a closed position of the door, first and second brackets engaged with opposing exterior sides of the housing, the first and second brackets each configured to selectively slide along a vertical axis of the housing to permit adjustment of a height of the brackets relative to the housing;

a light emitting module positioned inside the interior cavity of the housing, including:

a heat sink;

a circuit board stacked on the heat sink;

a light source mounted at a center of the circuit board on a side of the circuit board opposite the heat sink;

driver circuitry mounted on a portion of the circuit board surrounding the light source, the driver circuitry configured for powering the light source; and a cover stacked on the circuit board including a channel sized and positioned to enclose the driver circuitry and defining an opening sized and positioned such that the light source is not covered by the cover; and a trim assembly installed in the housing through the open end, including:

a reflector including at least one reflective surface positioned to direct light from the light source toward a lens;

the lens positioned between the reflector and a trim;

the trim including:

a light guide portion extending from the lens through the open end of the housing to a base of the light guide portion; and a decorative trim extending radially outward from the base of the light guide portion; and a plurality of interface elements extending from an exterior surface of the reflector or an exterior surface of the light guide portion of the trim, the interface elements configured to exert a radial force on an interior surface of the housing to retain the trim assembly in the housing;

a length-adjustable hanger bar for suspending the housing between two structural building elements, the length-adjustable hanger bar extending through first and second slots formed, respectively, in an end of each of the first and second brackets proximate the closed rear face of the housing, wherein a position of the housing can be adjusted laterally relative to an opening in a ceiling or wall by sliding the housing, through the slots, along the length-adjustable hanger bar, and wherein a position of the housing can be adjusted vertically relative to the opening in the ceiling or wall by adjusting a height of the brackets relative to the housing.

* * * * *